(12) United States Patent
Kaplan et al.

(10) Patent No.: US 11,409,685 B1
(45) Date of Patent: Aug. 9, 2022

(54) DATA SYNCHRONIZATION OPERATION AT DISTRIBUTED COMPUTING SYSTEM

(71) Applicant: Amazon Technologies, Inc., Seattle, WA (US)

(72) Inventors: Patricio Kaplan, Palo Alto, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/031,653

(22) Filed: Sep. 24, 2020

(51) Int. Cl.
| | |
|---|---|
| *G06F 13/40* | (2006.01) |
| *G06F 13/28* | (2006.01) |
| *G06F 13/42* | (2006.01) |
| *G06F 9/48* | (2006.01) |
| *G06N 3/08* | (2006.01) |
| *G06F 15/173* | (2006.01) |
| *H04L 67/1095* | (2022.01) |

(Continued)

(52) U.S. Cl.
CPC ........ *G06F 13/4027* (2013.01); *G06F 9/4812* (2013.01); *G06F 13/28* (2013.01); *G06F 13/4022* (2013.01); *G06F 13/4282* (2013.01); *G06F 15/17331* (2013.01); *G06N 3/08* (2013.01); *H04L 49/15* (2013.01); *H04L 49/90* (2013.01); *H04L 67/1095* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,286,548 | B1 * | 10/2007 | Jair | H04L 49/901 710/60 |
| 9,985,903 | B2 | 5/2018 | Shalev et al. | |
| 10,949,365 | B2 * | 3/2021 | Jacobs | G06F 13/42 |

(Continued)

OTHER PUBLICATIONS

U.S. Appl. No. 17/031,668, U.S. Patent Application, filed Sep. 24, 2020, Titled: Memory Access Operation in Distributed Computing System.

(Continued)

*Primary Examiner* — Henry Tsai
*Assistant Examiner* — Christopher A Bartels
(74) *Attorney, Agent, or Firm* — Kilpatrick Townsend & Stockton LLP

(57) ABSTRACT

In one example, a method comprises: receiving, by a hardware data processor and from a network adapter, a transfer complete message indicating that the network adapter has initiated a transfer of data received from a network to the hardware data processor, the transfer being performed over an interconnect coupled between the hardware data processor and the network adapter; based on receiving the transfer complete message, performing, by the hardware data processor, a flush operation to fetch any remaining portion of the data buffered in the interconnect to a local memory of the hardware data processor; based on determining that flush operation is complete, storing, by the data hardware processor, the transfer complete message at the local memory; and based on determining that the transfer complete message is stored at the local memory, starting the computation operation of the data at the hardware data processor or preforming an error handling operation.

20 Claims, 22 Drawing Sheets

(51) Int. Cl.
*H04L 49/90* (2022.01)
*H04L 49/15* (2022.01)

(56) References Cited

U.S. PATENT DOCUMENTS

| | | | |
|---|---|---|---|
| 2004/0010612 A1* | 1/2004 | Pandya | H04L 69/329 709/213 |
| 2004/0093411 A1 | 5/2004 | Elzur et al. | |
| 2006/0136570 A1* | 6/2006 | Pandya | H04L 69/16 709/217 |
| 2006/0236063 A1 | 10/2006 | Hausauer et al. | |
| 2006/0256784 A1 | 11/2006 | Feng et al. | |
| 2006/0259661 A1 | 11/2006 | Feng et al. | |
| 2009/0077567 A1 | 3/2009 | Craddock et al. | |
| 2009/0254647 A1 | 10/2009 | Elzur et al. | |
| 2013/0198538 A1* | 8/2013 | Diab | G06F 1/3278 713/310 |
| 2015/0039712 A1 | 2/2015 | Frank et al. | |
| 2015/0088483 A1 | 3/2015 | Aarts et al. | |
| 2017/0187621 A1 | 6/2017 | Shalev et al. | |
| 2017/0346596 A1* | 11/2017 | Desimone | H04L 1/0034 |
| 2018/0102978 A1 | 4/2018 | Shen et al. | |
| 2018/0287869 A1* | 10/2018 | Munafo | H04L 63/0853 |
| 2019/0171612 A1 | 6/2019 | Shahar et al. | |
| 2019/0303297 A1* | 10/2019 | Fleming, Jr | G06F 12/0853 |
| 2019/0347125 A1* | 11/2019 | Sankaran | G06F 9/30047 |
| 2019/0392297 A1* | 12/2019 | Lau | G06N 3/0454 |
| 2020/0151104 A1* | 5/2020 | Yang | G06F 13/1668 |
| 2020/0174840 A1* | 6/2020 | Zhao | G06N 3/084 |
| 2020/0178198 A1* | 6/2020 | Ding | G07C 5/008 |
| 2020/0242258 A1* | 7/2020 | Smith | G06F 21/335 |
| 2020/0314181 A1 | 10/2020 | Eran et al. | |
| 2020/0334195 A1 | 10/2020 | Chen et al. | |
| 2021/0076275 A1* | 3/2021 | Yiu | H04W 36/0088 |
| 2021/0117360 A1* | 4/2021 | Kutch | G06F 13/4027 |
| 2021/0149441 A1* | 5/2021 | Bartscherer | G06F 1/1605 |

OTHER PUBLICATIONS

U.S. Appl. No. 17/038,623, U.S. Patent Application, filed Sep. 30, 2020, Titled: Control Plane Operation at Distributed Computing System.

Daoud et al., "Asynchronous Peer-to-Peer Device Communication", OpenFabrics Alliance 13th Annual Workshop, Mar. 28, 2017, 26 pages.

* cited by examiner

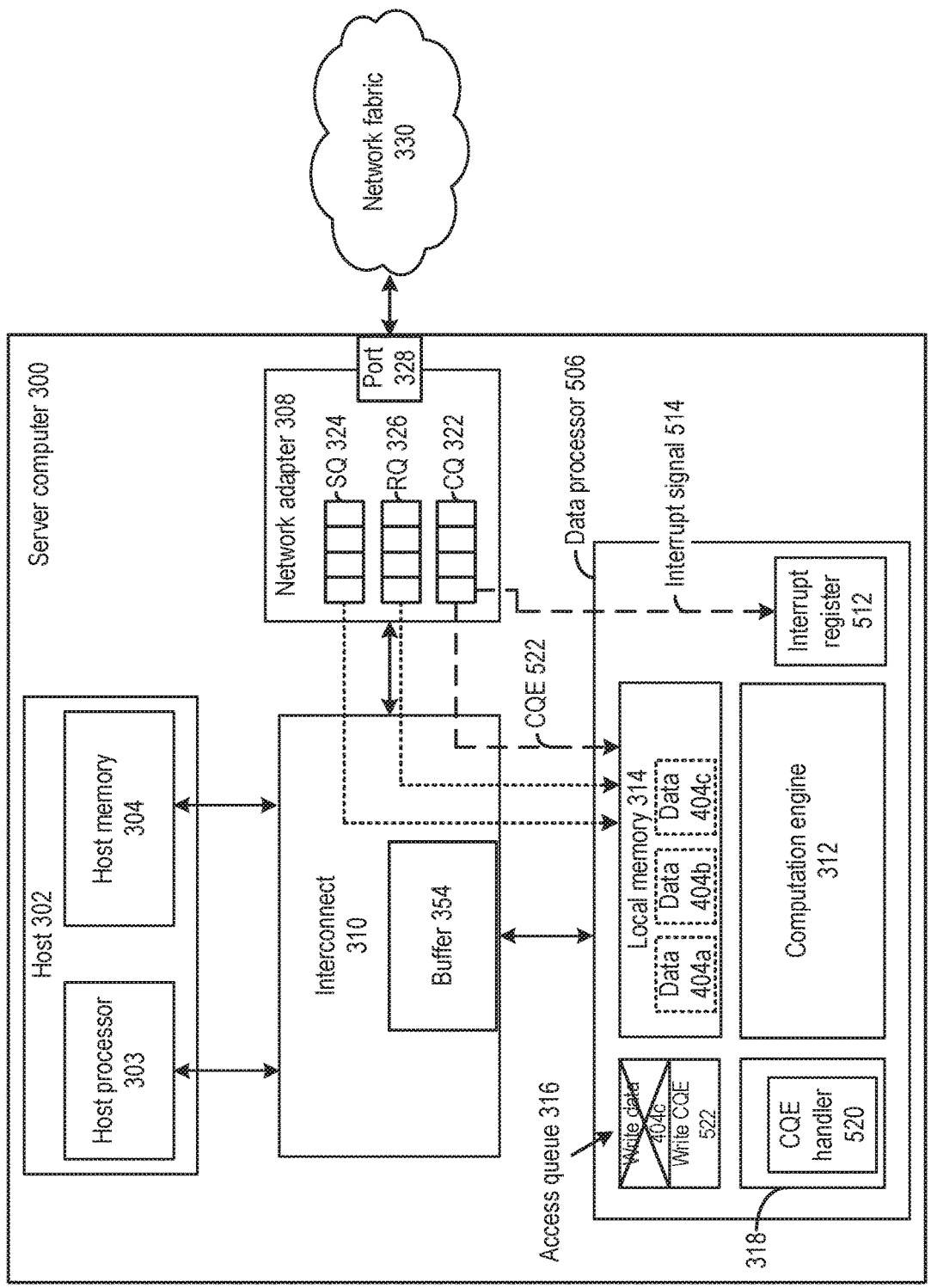

DATA SYNCHRONIZATION OPERATION AT DISTRIBUTED COMPUTING SYSTEM

BACKGROUND

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network and perform the sub-operation on the subset of the data in parallel to generate the output. As a result of the parallel processing, the time required to complete the computation operation can be substantially reduced compared with a case where the sub-operations are performed sequentially at a single computing device, which can lead to a substantial performance improvement. However, the performance improvement brought about by a distributed computing system can diminish due to various internal latencies at the computing device.

BRIEF DESCRIPTION OF THE DRAWINGS

Various embodiments in accordance with the present disclosure will be described with reference to the drawings, in which:

FIG. 5A, FIG. 5B, FIG. 5C, FIG. 5D, FIG. 5E, and FIG. 5F illustrate examples of a computing server and a data synchronization operation performed by the computing server, according to examples of the present disclosure.

DETAILED DESCRIPTION

Figure 1A:
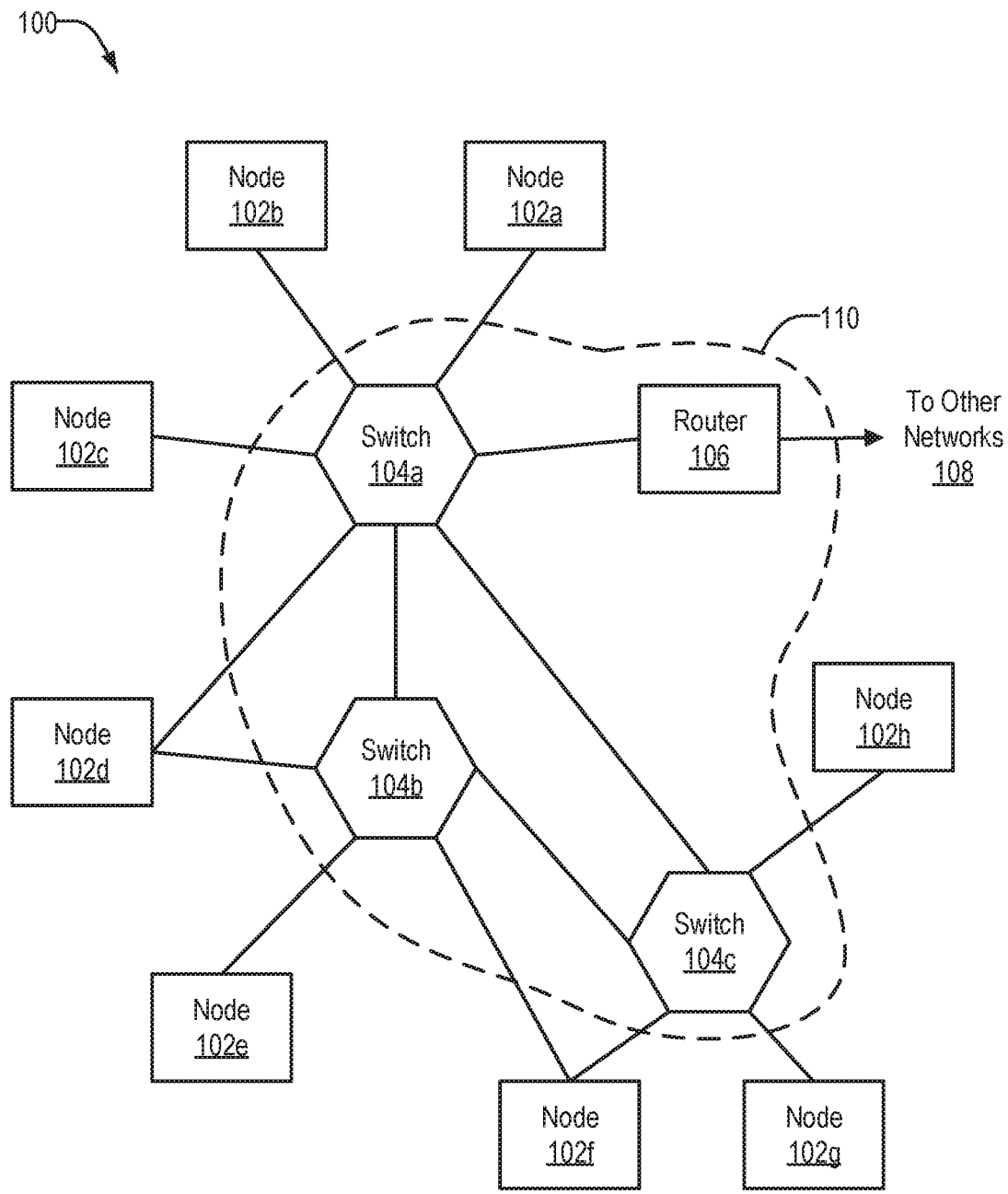
FIG. 1A, FIG. 1B, FIG. 1C, and FIG. 1D illustrate an example computing cluster and examples of distributed computation operations that can use techniques of the present disclosure.

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network and perform the sub-operation on the subset of the data in parallel to generate the output.

Various computation operations can be performed by a distributed computing system, such as an artificial neural network computation operation. An artificial neural network (hereinafter, neural network) is typically implemented in a computing system to have an architecture based on biological neural networks, and to process input data in an analogous fashion as biological neural networks. A neural network typically includes a number of cascading neural network layers, with each layer including a set of weights. In an inference operation, a first neural network layer can receive an input data set, combine the input data set with the weights (e.g., by multiplying the input data set with the weights and then summing the products) to generate a first output data set for the first neural network layer, and propagate the first output data set to a second neural network layer, in a forward propagation operation. The second neural network layer performs another set of forward propagation operations on the first output data set to generate a second output data set, and propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training operation to improve the likelihood of the neural network generating a correct decision. An example training operation can use a gradient descent scheme. Specifically, as part of the training operation, a sequence of forward propagation operations can be performed on a training input data set, using the set of weights at each neural network layer, to generate a training output data set at the highest level neural network layer. The training output data set can be compared with a reference output data set that supports a particular decision. A set of input data gradients can be generated based on, for example, differences between the training output data set and the reference output data set.

As part of the training operation, each neural network layer can then perform a sequence of backward propagation operations to adjust the set of weights at each neural network layer. Specifically, the highest neural network layer can receive the set of input data gradients and compute, in a backward propagation operation, a set of first data gradients and a set of first weight gradients based on applying the set of weights to the input data gradients in similar mathematical operations as the forward propagation operations. The highest neural network layer can adjust the set of weights of the layer based on the set of first weight gradients, whereas the set of first data gradients can be propagated to the second highest neural network layer to influence the adjustment of the set of weights of the previous neural network layer. The backward propagation operations can start from the highest neural network layer and end at the first neural network layer. The set of weights at each neural network layer can be adjusted, to complete one iteration of the training operation. The training operation can be repeated for the same input data set for a number of iterations until a loss objective (e.g., a threshold input data gradient) is achieved.

A training operation is typically a time-consuming process due to the sequential nature and data dependency among the operations involved in the training operation, and due to the large volume of training data involved in the training operation to cover different operation conditions. One way to accelerate the training operation is by using a distributed computing system to distribute the training operation across multiple computing systems, each of which can be configured as a worker node. A set of training input data can be split into multiple portions, with each portion to be processed by a worker node. Each worker node can perform the forward propagation operations independently, and in parallel with each other, based on a portion of the training input data, to generate intermediate outputs for each neural network layer.

After the forward propagation operations complete, each worker node can then perform the backward propagation operations to generate a set of weight gradients for each neural network layer. After the backward propagation operations, each worker node can exchange its set of weight gradients with other worker nodes, and average its set of weights gradients and the sets of weight gradients received from other worker nodes. Each worker node can then have the same set of averaged weight gradients. Each worker node can update the weights for each neural network layer based on the averaged weight gradients. Each worker node can then perform another batch of forward and backward propagation operations using the updated weights on another set of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Although a distributed computing system can substantially reduce the time required to complete a computation operation, the performance improvement brought about by a distributed computing system can diminish due to various internal latencies at the computing device. One example source of internal latencies can be due to data synchronization operations at the computing devices. Specifically, a computing device may include a host processor, as well as a hardware data processor (e.g., a neural network hardware accelerator) which can be controlled by the host processor to perform computation operations (e.g., a training operation). The hardware data processor can receive a pre-determined set of data from a network via a network adapter, and can be controlled by the host processor to perform computation operations on the pre-determined set of data. The hardware data processor, the host processor, and the network adapter can be interconnected via an interconnect, such as a Peripheral Component Interconnect Express (PCIE)) interconnect implemented as a root-complex switch.

To reduce the host processor's involvement in the transfer of the data from the network adapter to the hardware data processor, which can reduce the data transfer latency between the network adapter and the hardware data processor, the network adapter may implement a Remote Direct Memory Access (RDMA) protocol. With RDMA protocol, packets received from the network can be transferred directly to the local memory of hardware data processor, via the interconnect, with minimum intervention from the host processor. To support the RDMA protocol, the network adapter can implement a queue pair comprising a send queue and a receive queue, and a completion queue. The send queue can be used to schedule read operations at the memory of the hardware data processor to obtain data for packet generation and transmission, whereas the receive queue can be used to schedule write operations at the memory of the hardware data processor to store data of packets received from the network. The completion queue can track the status of the read/write operations scheduled at the send and receive queues.

Specifically, when the network adapter receives a set of packets from the network as part of a transaction (e.g., a read transaction, a write transaction, an atomic transaction), a work queue element (WQE) can be posted in the receive queue for the transaction, and multiple WQEs can be posted for multiple transactions for multiple sets of packets. The network adapter can then process each WQE following the receive queue order by initiating a transfer of the set of packets associated with the WQE to the local memory of hardware data processor. The transfer of the set of packets can be via the interconnect and can include transmitting write requests to the hardware data processor. The hardware data processor can include a request queue to buffer the write requests, and can execute the write requests by fetching the packets from the internal buffer of the interconnect to the local memory. After the transfer is initiated for a WQE, the network adapter can post a transfer complete message, such as a completion queue element (CQE), at the completion queue to indicate that the WQE has been processed. The transfer complete message can indicate that network adapter has initiated the transfer of data to hardware data processor via the interconnect. The CQE can also indicate that a transfer of data for the transaction has been completed from the perspective of the network adapter. The CQE can also include other information, such as a status of reception/transmission of packets (e.g., whether there are missing packets, whether the packets contain data error). The completion queue can be mapped to the host memory, which allows the host processor to receive the CQE from the network adapter. The host processor may control the hardware data processor to perform (or not to perform) a computation operation on the data included in the set of packets based on receiving the CQE. For example, the data included in the set of packets may represent weight gradients. Upon receiving the CQE, the host processor can control the hardware data processor to update the weights using the weight gradients from the local memory, and perform forward and/or backward propagation operations using the updated weights. In a case where the CQE indicates missing or corrupted data, the host processor can also control the hardware data processor not to perform the computation operation on the data.

Although the RDMA protocol can reduce the data transfer latency between the network adapter and the hardware data processor, data coherency issues may arise. Specifically, when the network adapter posts a CQE in the completion queue, some packet data of the transaction may remain buffered in the interconnect, and there can be outstanding write requests stored in the request queue of the hardware data processor. This can be due to, for example, a flow control mechanism implemented at the interconnect. The flow control mechanism may be implemented to, for example, police/shape the volume of communication traffic from different sources (e.g., the host processor, the network adapter, or other components) into the hardware data processor, to prevent a particular source from dominating the communication with the hardware data processor. In addition, the flow control mechanism may also be implemented to limit the rate at which the hardware data processor receives data to accommodate, for example, bandwidth/speed limitation of the local memory of the hardware data processor. If the host processor controls the hardware data processor to start the computation operation based on the CQE and without checking whether all the data of the transaction have actually been written into the local memory of the hardware data processor, the hardware data processor may perform the computation operation based on incomplete or stale data from the local memory, which can lead to data coherency issues.

To ensure data coherency, a multi-step data synchronization operation involving the host processor, the network adapter and the hardware data processor can be performed. Specifically, as a first step of the data synchronization operation, the host processor can first receive a CQE from the network adapter, which indicates that the transfer of a pre-determined set of packets of a transaction to the local memory of the hardware data processor has been initiated. The network adapter can send the CQE to the host processor by, for example, writing the CQE at the host memory via a direct memory access (DMA) operation. To ensure that the hardware data processor has received the entire set of data before beginning the computation operation, the host processor may, upon receiving the CQE from the network adapter, perform a second step of the data synchronization operation, in which the host processor requests the network adapter to perform a flush operation. As a third step of the data synchronization operation, to perform the flush operation, the network adapter can transmit a read request (e.g., a PCIE read) of the hardware data processor's local memory. The read request can cause the hardware data processor to complete all of the outstanding write requests received before the read request, including the write requests to fetch the buffered packets in the interconnect into the local memory of the hardware data processor. As a result of the flushing operation, the local memory of the hardware data processor can store the full set of packets of the transaction. After the flushing operation completes, the hardware data processor can transmit a read response back to the network adapter as a third step of the synchronization operation. As a fourth step of the synchronization operation, the network adapter can then transmit to the host processor an indication indicating that the flush operation at the hardware data processor is complete. In each step of the synchronization operation, the CQE, the flush operation request, the read request, and the read response can be transmitted in the form of messages. At the end of the synchronization operation, upon receiving the message, the host processor can control the hardware data processor to perform the computation operation on the data from the local memory.

The multi-step data synchronization operation described above can ensure that the hardware data processor can withhold a computation operation until the host processor confirms that the full set of packets of a transaction has been stored at the local memory of the hardware data processor. This can reduce the likelihood of the hardware data processor operating on an incomplete set of data, or a set of stale data, which can ensure data coherency. However, the data synchronization operation involves an exchange of messages between the host processor and the network adapter, and exchange of message between the network adapter and the hardware data processor. As each exchange of messages incurs a considerable round-trip delay, the transmission latencies can add up and slow down the data synchronization operations. This can also substantially increase the overall time of the computation operations at the hardware data processor, especially in a distributed training operation where a worker node needs to exchange weight gradients with each of other worker nodes in multiple transactions over the network. The overall performance of the distributed computing system can become degraded as a result.

Examples of the present disclosure relate to a data synchronization operation, and more specifically, to performing a data synchronization operation between a network adapter and a hardware data processor (e.g., a neural network hardware accelerator) having a reduced latency. The network adapter and the hardware data processor can be connected via an interconnect (e.g., a PCIE root complex). The network adapter may support the RDMA protocol and implement a queue pair comprising a send queue and a receive queue, and a completion queue. As described above, when the network adapter receives a set of packets from the network as part of a transaction, a WQE can be posted in the receive queue for the transaction. The network adapter can then process the WQE by initiating a transfer of the set of packets associated with the WQE to the local memory of hardware data processor. The transfer of the set of packets can be via the interconnect and can include transmitting write requests to the hardware data processor, which can buffer the write requests in a request queue. After the transfer is initiated for a WQE, the network adapter can post a completion queue element (CQE) at the completion queue to indicate that the WQE has been processed. But instead of sending the CQE to the host processor, the network adapter can transmit another write request to store the CQE at the local memory of the hardware data processor. In some examples, the network adapter can also store an interrupt signal indicating the posting of the CQE at, for example, an interrupt register of the hardware data processor.

The hardware data processor, upon receiving the write request/interrupt of the CQE, can perform a flush operation to execute all other outstanding write requests in the request queue. As a result of the flush operation, the remaining buffered packets in the interconnect can be written into the local memory of the hardware data processor, so that the local memory can store the full set of data of the transaction. After the flush operation completes, the hardware data processor can store the CQE at the local memory based on, for example, executing a write request in the request queue for the CQE, or based on the interrupt signal. The hardware data processor can then take various actions upon storing the CQE at the local memory. For example, in a case where the host processor initiates the computation operation at the hardware data processor, the hardware data processor can send the CQE to the host processor (e.g., writing the CQE at the host memory using a DMA operation over the interconnect) to cause the host processor to send an instruction back to the hardware data processor to start the computation operation. As another example where the host processor does not initiate the computation operation at the hardware data processor (e.g., in a case where the hardware data processor operates asynchronously from the host processor), the hardware data processor can also initiate the computation operation upon storing the transfer complete indication at the local memory.

With the disclosed techniques, a data synchronization operation can be performed such that the hardware data processor starts a computation operation on data from the local memory only after completing the flushing operation, which can ensure data coherency for the computation operation. On the other hand, as the data synchronization operation mostly involves the transmission of CQE in a single direction (e.g., from network adapter to the hardware data processor, and optionally from the hardware data processor to the host processor) and does not involve multiple exchanges of messages, the transmission latencies incurred by the transmission of CQE can be reduced, which can speed up the data synchronization operations. The speeding up of the data synchronization operations is especially critical for a distributed system where a computing device needs to perform multiple transactions over the network with other computing devices, and where a data synchronization operation is performed for each transaction. As a result, the performance of the distributed system in handling a distributed computation operation, such as a training operation of a neural network, can be substantially improved.

In the following description, various examples will be described. For purposes of explanation, specific configurations and details are set forth to provide a thorough understanding of the examples. However, it will also be apparent to one skilled in the art that the example may be practiced without the specific details. Furthermore, well-known features may be omitted or simplified in order not to obscure the embodiments being described.

FIG. 1A illustrates an example of a computing cluster 100. Computing cluster 100 can include a group of computing resources connected with switches, and can be configured to run in parallel. In many implementations, the various computing resources form a single logical computing resource. The example computing cluster 100 illustrated in FIG. 1A includes multiple nodes 102a-h and switches 104a-c. In some implementations, computing cluster 100 may also include a router 106.

The nodes 102a-h illustrated in FIG. 1A may represent various computing resources. For example, one or more nodes 102a-h may be a computer, such as a server computer. Computers used in cluster applications may include one or more processors, and these processors may include one or more processing cores. These computers may also include memory and peripheral devices. In some implementations, these computers may use an adapter device to connect to a switch 104a-c in computing cluster 100. Other examples of computing resources include storage devices (e.g., hard drives), storage subsystems (e.g., an array of storage devices), Input/Output (I/O) modules, and hardware data processors such as hardware neural network accelerators.

The switches 104a-c may provide connectivity between the various nodes 102a-h. Each node 102a-h may be connected to computing cluster 100 through a connection with a switch 104a-c. In some cases, anode 102a-h may be connected to more than one switch 104a-c. Switches may also be connected to other switches. In most cases, any port on a switch 104a-c may be used to connect to either a node 102a-h or another switch. In most implementations, size of computing cluster 100 can quickly and easily be expanded by connecting more switches and nodes.

The network of switches 104a-c may provide multiple paths from any node 102a-h to any another node 102a-h. A switch 104a-c may have multiple connections with another switch 104a-c, which provides additional paths between the switches 104a-c. In some cases, the nodes 102a-h may be connected to more than one switch 104a-c, also creating more paths. Packets from one node 102a-h may use multiple paths at the same time to reach another node 102a-h. Alternatively or additionally, packets from one node 102a-h to another node 102a-h may follow only one path. In some cases, at each switch 104a-c a decision may be made as to which path a packet will follow. In other cases, a packet's path may be determined in advance, typically at the source node. A stream of packets from one node 102a-h to another node 102a-h may be referred to as a packet flow, or simply as a "flow." In some cases, the packets in a flow are related, such as for example when the packets together form one message.

In some implementations, computing cluster 100 may be connected to a router 106. The router 106 may provide a connection to other networks 108, such as other clusters or sub-networks (subnets), Local Area Networks (LANs), Wide Area Networks (WANs), or the Internet.

The interconnected switches 104a-c (and the router 106, if present) may be referred to as a switch fabric, fabric, or more simply "network." Herein, the terms "fabric" and "network" may be used interchangeably.

Computing cluster 100, may provide more computing power and better reliability. The individual computing resources may work cooperatively to solve a large problem that one computer may not be able to solve alone, or may take a very long time to solve alone. In some cases, a computing cluster may provide performance similar to a super computer but for less cost and with less complexity. The switched fabric architecture used by a computing cluster may also have the advantage of being fault tolerant and scalable. In a switched fabric architecture, typically every link has one device attached at each end of a link. Hence, each link is only depending on the behavior of, at most, two devices. A switched fabric may also be easily scaled by adding more switches, which provides more ports to attach more nodes. In some cases, adding more switches may increase the aggregate bandwidth of the cluster. Multiple paths between the nodes may also keep aggregate bandwidth high, and provide redundant connections in case of link failures.

Computing cluster 100 may be used for various applications, such as high-performance computing. High performance computing involves using parallel processing to run compute-intensive applications. Scientific researches, engineers, and academic institutions may use high performance computing for complex modeling or simulations, such as for example car crash simulations, weather modeling, or atomic simulations. In addition, computing cluster 100 may be used for financial applications, distributed storage, and databases. Financial applications, such as high-frequency trading, may also examine large amounts of data, and are generally relied upon to react quickly (i.e., much faster than a human being) to changes in the data. Distributed storage allows very large amounts of data to be accessed from multiple locations. Storage area networks are one form of distributed storage. Databases also store a large amount of data and must provide fast ways to locate specific information stored within the database.

Figure 1B:
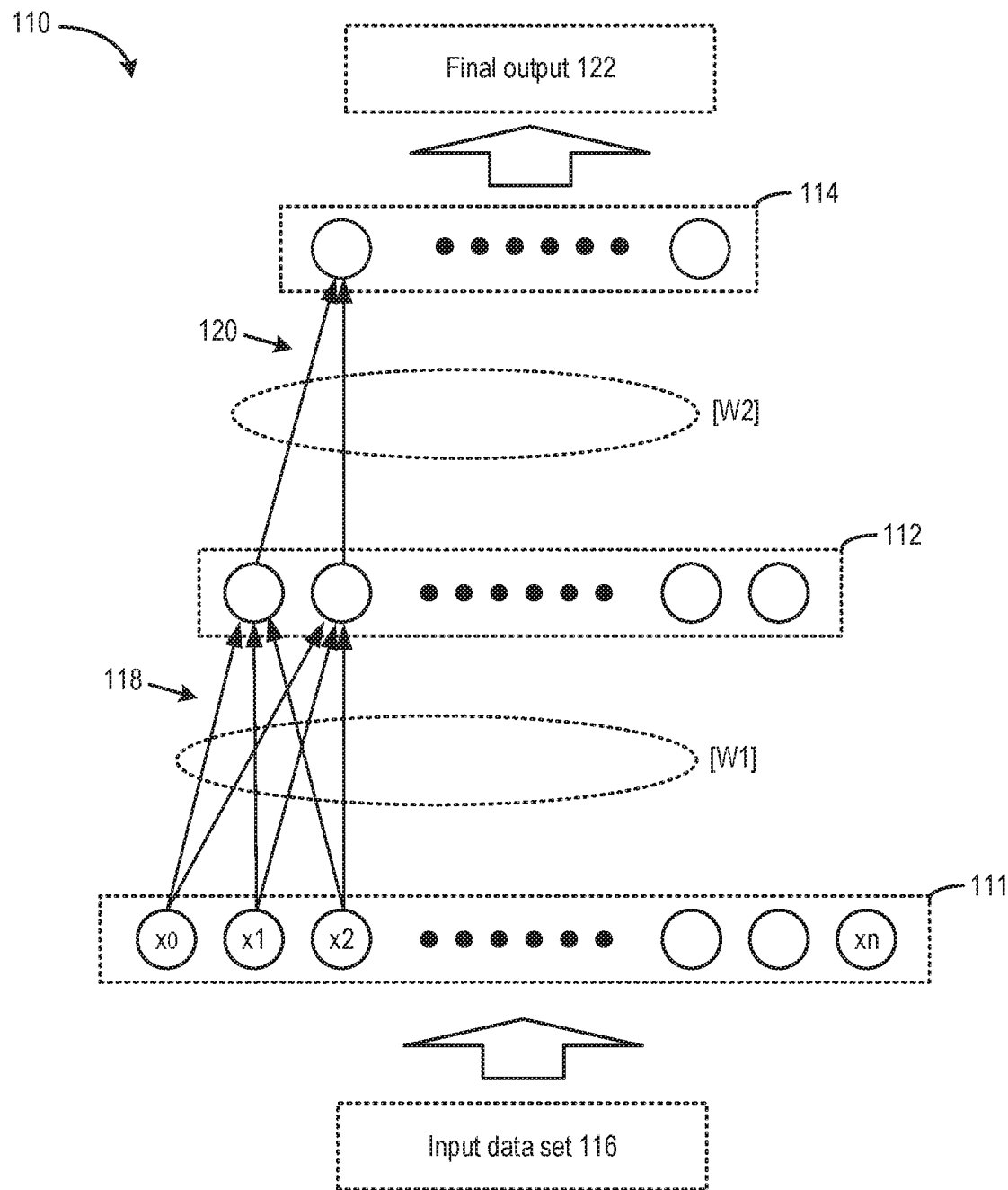

In some examples, computing cluster 100 can be used to support neural network computation operation. A neural network is typically implemented in a computing system to have an architecture based on biological neural networks, and to process input data in an analogous fashion as biological neural networks. FIG. 1B illustrates an example of an artificial neural network 110. As shown in FIG. 1B, a neural network typically includes a number of cascading neural network layers, including first neural network layer 111, second neural network layer 112, third neural network layer 114, etc. Each layer may be associated with a set of weights, such as weights labelled "[W1]" and "[W2]". In an inference operation, first neural network layer 111 can receive an input data set 116, which can include, for example, image data, audio data, medical data, or other type of data to be analyzed. First neural network layer 111 can combine input data set 116 with the weights [W1] (e.g., by multiplying the input data set with the weights and then summing the products) to generate a first output data set 118 for first neural network layer 111, and propagate first output data set 118 to second neural network layer 112, in a forward propagation operation. Second neural network 112 layer performs another set of forward propagation operations on first output data set 118 from first neural network layer 111 to generate a second output data set 120, and propagate second output data 120 set to third neural network layer 114. In FIG. 1B, third neural network layer 114 can be the highest output neural network layer and can generate a final output 122 including a decision/prediction made about input data set 116. Final output 122 may indicate, for example, whether an image contains a target object, information contained in audio data, or a clinical prediction of a patient.

Figure 1C:
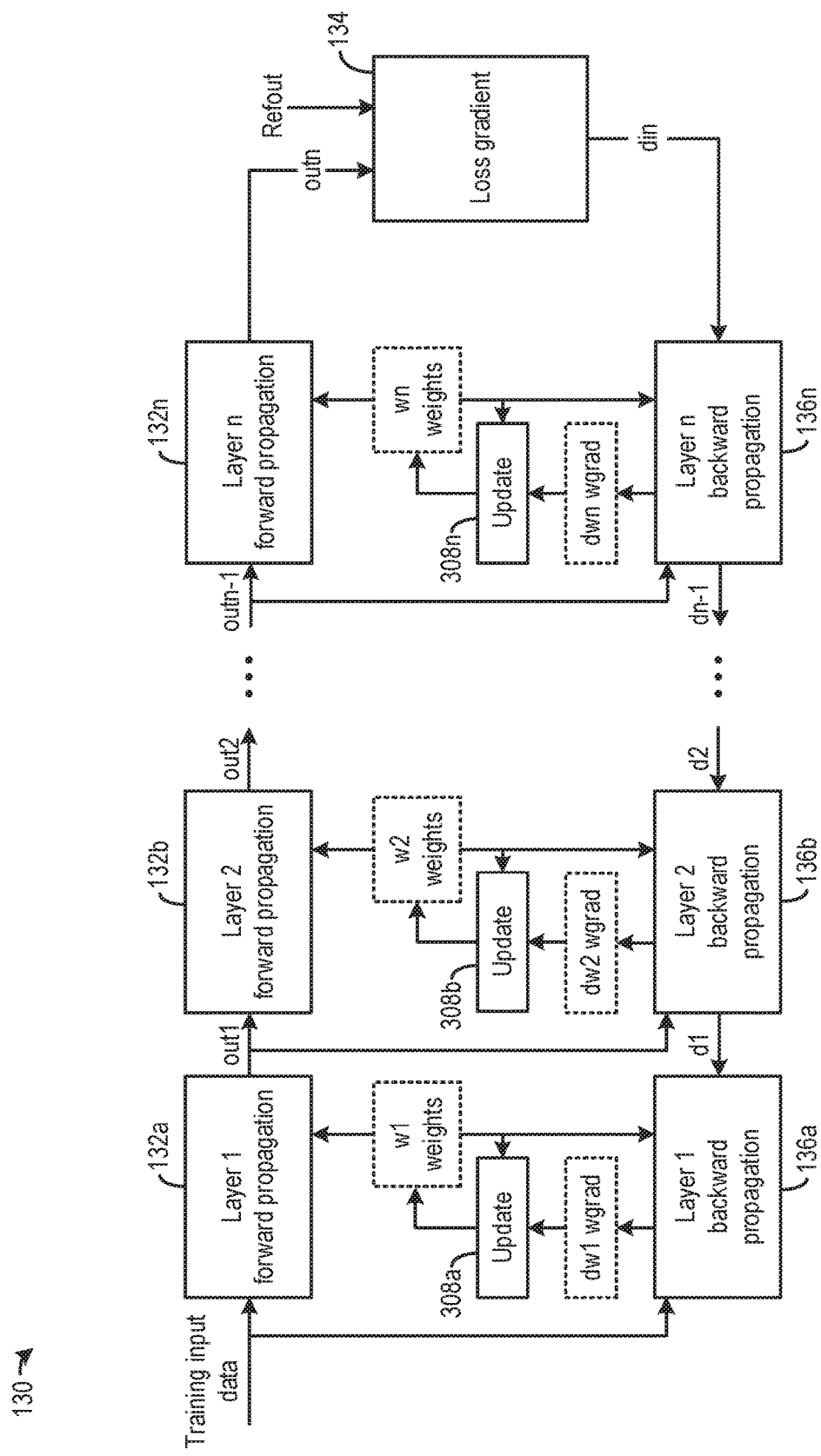

The set of weights of neural network 110 can be generated and/or updated by a training operation to improve the likelihood of the neural network generating a correct decision. FIG. 1C illustrates an example of a training operation 130 based on a gradient descent scheme. Specifically, as part of the training operation, a sequence of forward propagation operations, including operations 132a, 132b, and 132n, can be performed on a training input data set, using the set of weights at each neural network layer, to generate a training output data set (labelled "outn" in FIG. 1C) at the highest level neural network layer. The training output data set can be compared with a reference output data set (labeled "refout" in FIG. 1C) that supports a particular decision. A set of input data gradients (labeled "din" in FIG. 1C) can be generated by applying a loss gradient function 134 on, for example, differences between the training output data set and the reference output data set.

As part of the training operation, each neural network layer can then perform a sequence of backward propagation operations 136 to adjust the set of weights at each neural network layer. Specifically, the highest neural network layer (e.g., third neural network layer 114) can receive the set of input data gradients and compute, in a backward propagation operation 134n, a set of first data gradients (labeled "dn-1") and a set of first weight gradients (labelled "dwn wgrad") based on applying the set of weights to the input data gradients in similar mathematical operations as the forward propagation operations. The highest neural network layer can perform a weight update operation 308n to adjust the set of weights of the layer based on the set of first weight gradients, whereas the set of first data gradients dn-1 can be propagated to the second highest neural network layer to influence the adjustment of the set of weights of the previous neural network layer. The backward propagation operations can start from the highest neural network layer and end at the first neural network layer. The set of weights at each neural network layer can be adjusted at a respective update operation (e.g., update operations 308b, 308a), to complete one iteration of the training operation. The training operation can be repeated for the same input data set for a number of iterations until a loss objective (e.g., a threshold input data gradient) is achieved.

Figure 1D:
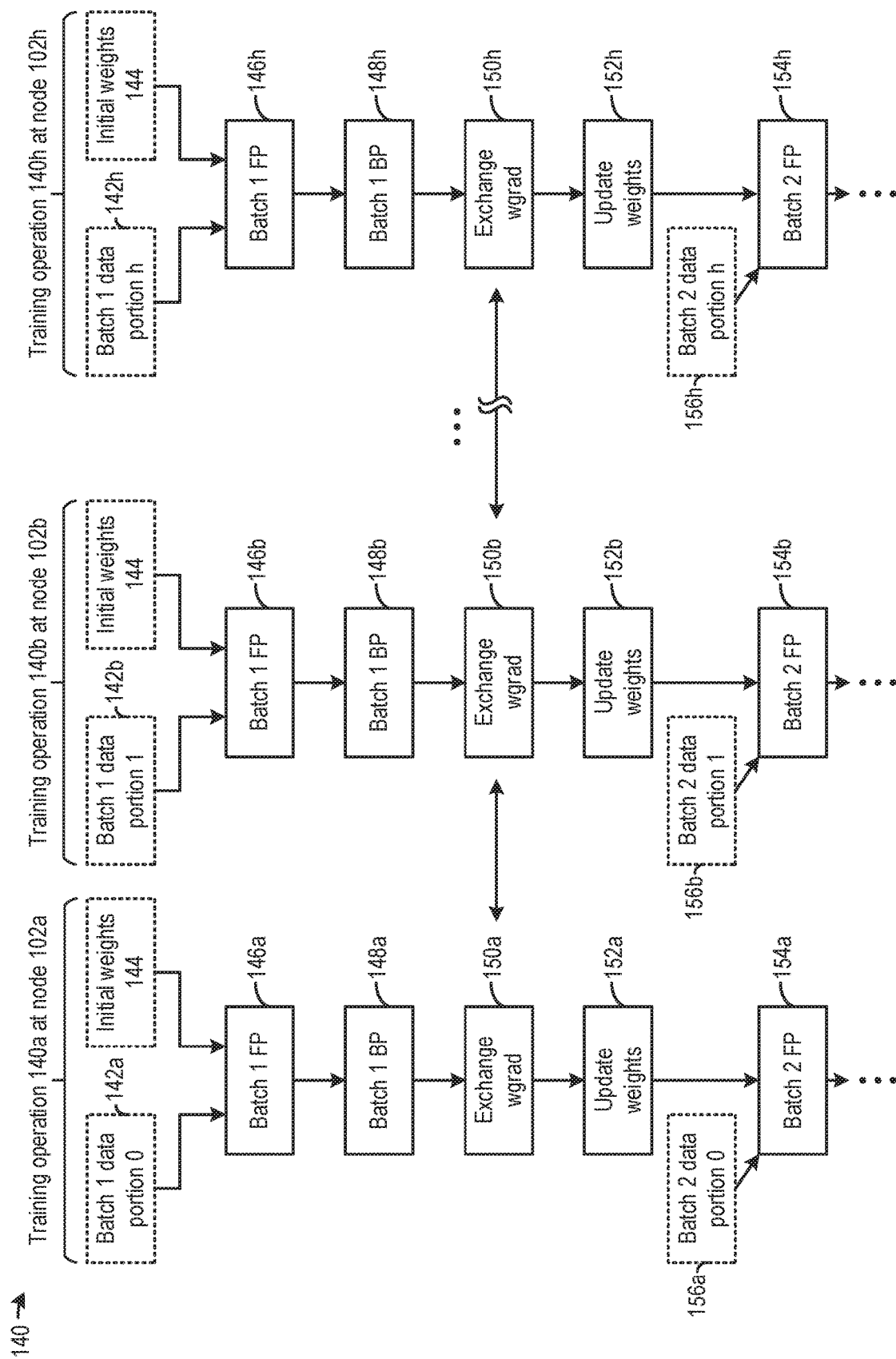

A training operation is typically a time-consuming process due to the sequential nature and data dependency among the operations involved in the training operation, and due to the large volume of training data involved in the training operation to cover different operation conditions. One way to accelerate the training operation is distribute the training operation across a distributed computing system, such as computing cluster 100. FIG. 1D illustrates an example of a distributed training operation 140, which includes training operations 140a, 140b, and 140h, with each training operation performed at a node of computing cluster 100 such as nodes 102a-102h, with each node configured as a worker node to perform a training operation. A first batch of training input data can be split into multiple portions 142a, 142b, 142h, etc., with each portion to be processed by, respectively, worker node/node 102a, 102b, and 102h. Each worker node can also receive the same initial set of weights 144, and perform the forward propagation operations 146 (e.g., forward propagation operations 146a, 146b, 146h) independently, and in parallel with other, based on the received portion of the training input data and weights 144, to generate intermediate outputs for each neural network layer.

After the forward propagation operations 146 complete, each worker node can perform the backward propagation operations 148 (e.g., backward propagation operations 148a, 148b, 148h) independently to generate a set of weight gradients for each neural network layer. After backward propagation operations 148, each worker node can perform an exchange operation 150 (e.g., exchange operations 150a, 150b, 150h), in which each worker node exchanges its set of weight gradients with other worker nodes over the network, and then determine averaged weight gradients for each neural network layer. The purpose of exchange operations 150 is to ensure that each worker node has the same set of weight gradients at the end of backward propagation operations 148, and can apply the same set of weight gradients to initial weights 144 to obtain the updated weights in weights update operations 152 (e.g., weights update operations 152a, 152b, 152h). Each worker node can then perform another batch of forward and backward propagation operations, such as forward propagation operations 154a, 154b, and 154h, using the updated weights on portions 156a 156b, and 156h of a second batch of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Compared with an arrangement where a single worker node is used to perform a training operation based on a large volume of training data, the distributed training operation 140 allows parallel training operation to be performed at multiple worker nodes, with each worker node operating on a portion of the training data. Such arrangements can substantially reduce the total time required to complete the training operation. But to achieve the most benefit from distributing the training operation over computing cluster 100, the protocol used for communication between nodes 102 of computing cluster 100 should provide high bandwidth and low latency. High bandwidth means that a large volume of traffic should be able to traverse the cluster, and low latency means that the traffic should be able to travel from source to destination as quickly as possible. Here, the source and destination refer not only the nodes, but also a process/operation on the nodes that release and consume the data, such as training operation 140a on node 102a and training operation 140b on node 102b. The total latency incurred in releasing the data from the source operation of a node into the network, transferring the data over the network, and delivering the data to the destination operation of another node, can slow down the execution of both the source and destination operations. For example, referring to FIG. 1D, worker node 102a completes the first batch of training operation 140a only after exchange operation 150a of weight gradients completes, and weights update operation 152a completes, before starting the second batch of training operation 140a. If exchange operation 150a takes a long time due to the latency incurred in transferring weight gradients, the total time required for each batch of training operation 140a will increase, which can diminish the performance improvements in distributing the training operation over computing cluster 100.

Several operations may be major contributors to latency. These include overhead caused by executing network protocol code within the operating system, context switches required to move in and out of kernel mode and to send out data, etc. For example, a typical network protocol stack may cause a round-trip latency of approximate 100 microseconds, assuming a non-congested, near-zero-delay network. This delay, however, may more typically be compounded with millisecond long spikes due to scheduling delays, tens of millisecond long spikes when an application is not designed to avoid network stack issues, and/or seconds-long delays when packets are dropped on a congested link. Computing clusters may be designed with high-bandwidth hardware, and high-bandwidth hardware is typically more sensitive to processor and memory copying overhead.

Virtual Interface (VI) Architecture (VIA) server messaging protocols were developed to provide high bandwidth, low latency links between nodes in a computing cluster. Examples of protocols similar to VIA include InfiniBand, Internet Wide Area RDMA Protocol (iWARP), and RDMA over Converged Ethernet (RoCE). Each of these protocols include a kernel bypass framework, often referred to as RDMA. iWARP provides a kernel bypass framework over the transmission control protocol/Internet protocol (TCP/IP) protocol. RoCE provides a kernel bypass framework over Ethernet-type networks. InfiniBand provides a kernel bypass framework over an InfiniBand-specific network. Sometimes the terms "InfiniBand" and "RDMA" are used interchangeably, though other protocols (such as iWARP and RoCE) also provide an RDMA-style, kernel bypass framework. RDMA-based devices may also allow multiple applications to directly access the hardware without interfering with each other. RDMA devices may rely on a kernel only for control operations, to perform initialization, and for some coordination that may be required for interrupt handling; but otherwise, an RDMA device may operate independently of the kernel. This means that a processor need not be involved in RDMA operations. RDMA frameworks may also provide optimizations such as polling-mode completion handling, which may be beneficial for providing ultra-low latency.

RDMA can include an extension of Direct Memory Access DMA. DMA typically allows certain hardware subsystems to access main system memory without using a processor. Similarly, RDMA allows one computer to access memory on another computer over a network, without involving a processor in either computer. Hence, a local computer may be able to perform reads, writes, or atomic operations on a remote computer's memory without intermediate copies being made by a processor at either the local or the remote computer. In many implementations, RDMA is made possible by the local computer and the remote computer each having an RDMA adapter.

Figure 2:
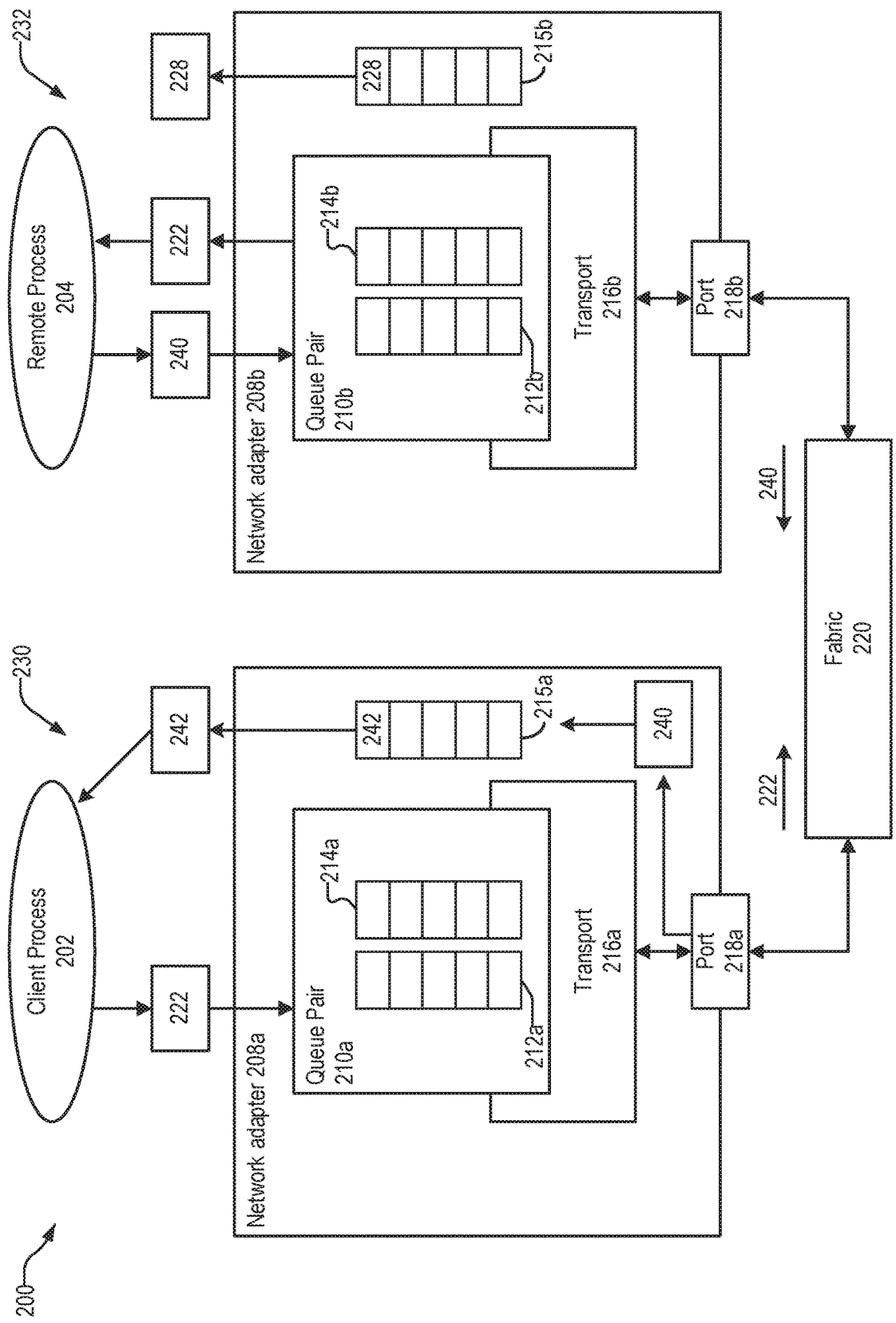
FIG. 2 illustrates an example of a communication stack that can use techniques of the present disclosure.

FIG. 2 illustrates an example of a communication stack 200 that may be used to implement a kernel bypass framework in cluster 100. Using communication stack 200, such as is illustrated in FIG. 2, a client process 202 may be able to communicate directly with a remote process 204 on a remote system 232 without help from a processor at either the local system 230 or the remote system 232. The example of FIG. 2 illustrates, as an example, a communication stack 200 between two processes executing on two different systems. As will be explained below, a similar communication stack can be configured between any two processes communicating across a network fabric 220, which can be an InfiniBand-specific network. Also, while one system 230 is called "local" and the other system 232 is called "remote," it is understood that in some implementations the communication stack 200 can also operate in the reverse direction, such that the remote system 232 can originate messages directed at the local system 230.

In some implementations, the communication stack 200 illustrated in FIG. 2 operates with minimal use of a processor at either the local 230 or the remote 232 system. Removing or reducing network traffic control duties from processors may be accomplished through "work queues," also called "work queue pairs" or simply "queue pairs" 210a-b. Queue pairs 210a-b can be implemented at the local memory of each network adapter (not shown in FIG. 2). For each communication channel between the local system 230 and the remote system 232, a queue pair 210a-b may be assigned at both systems 230, 232. A queue pair 210a-b includes a send queue 212a-b to manage processing of traffic headed for the network fabric 220, and a receive queue 214a-b to manage processing of traffic coming in from the network fabric 220. In some implementations, the client process 202 initiates a queue pair 210a-b when establishing a communication channel with the remote process 204. In these implementations, the client process 202 can initiate additional work queues for communicating with the same remote process 204, with different processes running on the same remote system 232, or with processes running on other remote systems. Client processes and remote processes include non-kernel or operating system processes, such as user applications and/or driver programs.

In some implementations, the queue pair 210a at the local system 230 resides on a network adapter 208a. Network adapter 208a may be configured to communicate with the network fabric 220. Network adapter 208a may include additional queue pairs that are assigned to other processes, to the same client process 202, or that may currently be unused. Queue pair 210a may be implemented in hardware, in software (for example in a driver), or in a combination of hardware and software. In addition to queue pair 210a, network adapter 208a further includes a completion queue 215a, which can be implemented in the local memory of network adapter 208a, to track the status of processing of the traffic managed by queue pair 210a. In addition, network adapter 208a may also include a transport layer 216a, which manages communication with the network fabric 220 and remote process 204. Network adapter 208a may also include a physical port 218a, connecting network adapter 208a to fabric 220.

The client process 202 may initiate a transaction to the remote process 204 by placing a "work queue element" (often abbreviated as WQE) into the local send queue 212a. In the example of FIG. 2, the WQE can represent/include a message 222 to be sent from client process 202 to remote process 204. The work queue element may represent a transaction, such as a read, a write, or an atomic transaction of data. In some implementations, the work queue element may also include information identifying the remote process 204 as the target of the transaction. Network adapter 208a may process the work queue element directly from send queue 212a. Network adapter 208a may generate one or more packets representing message 222 using the information in the work queue element. The transport layer 216a may transmit these one or more packets through the port 218a to the network fabric 220.

The remote system 232 may receive the packet or packets from the network fabric 220 at a network adapter 208b. Like network adapter 208a, network adapter 208b includes a port 218b connecting network adapter 208b to the network fabric 220. Network adapter 208b may also include a transport layer 216b, which manages communication with the network fabric 220 and the client process 202. Network adapter 208b may also include a queue pair 210b that is assigned to the remote process 204.

The packet or packets received at the remote system 232 from the network fabric 220 may be directed by the transport layer 216b to a receive queue 214b. In some implementations, network adapter 208b may reassemble message 222 generated by the client process 202, and place a WQE into receive queue 214b representing/including message 222. Network adapter 208b may pop the WQE from receive queue 214b and send message 222 to remote process 204. In addition, a "completion queue entry" (CQE) 228 can be stored in a completion queue 215b, which can be implemented in the local memory of network adapter 208b to provide an indication that message 22 has been transferred to remote process 204, and that remote process 204 can start operating on message 222. After operating on message 222, remote process 204 can generate a response 240 that is to be returned to the client process 202. The remote process 204 may place a work queue element, containing/representing the response, in its own send queue 212b. The response may then traverse the fabric 220 back to the local system 230, where it is stored in completion queue 215a as a CQE 242. CQE 242 can also be sent client process 202 to indicate that the transmission of message 222 completes.

In the example communication stack 200 of FIG. 2, the involvement of operating system kernel at both local system 230 and remote system 232 in transferring of messages 222 and response 240 are at a minimum. For example, client process 202 can send message 222 to network adapter 208a directly without involvement of the operating system kernel of local system 230. Likewise, remote 204 can receive message 222 directly from network adapter 208b without involvement of the operating system kernel of local system 232. As a result, the latency incurred delivering message 222 between client process 202 and remote process 204 can be reduced.

The kernel bypass framework, provided by communication stack 200, can also be implemented in a computing system having dedicated computing resources to support certain data processing applications, such as a neural network hardware accelerator to support neural network computations. In such a computing system, the dedicated computing resource can directly receive packets from the network adapter with minimum (or no) involvement from the operating system kernel, which can speed up the data processing application supported by the computing resource.

Figure 3A:
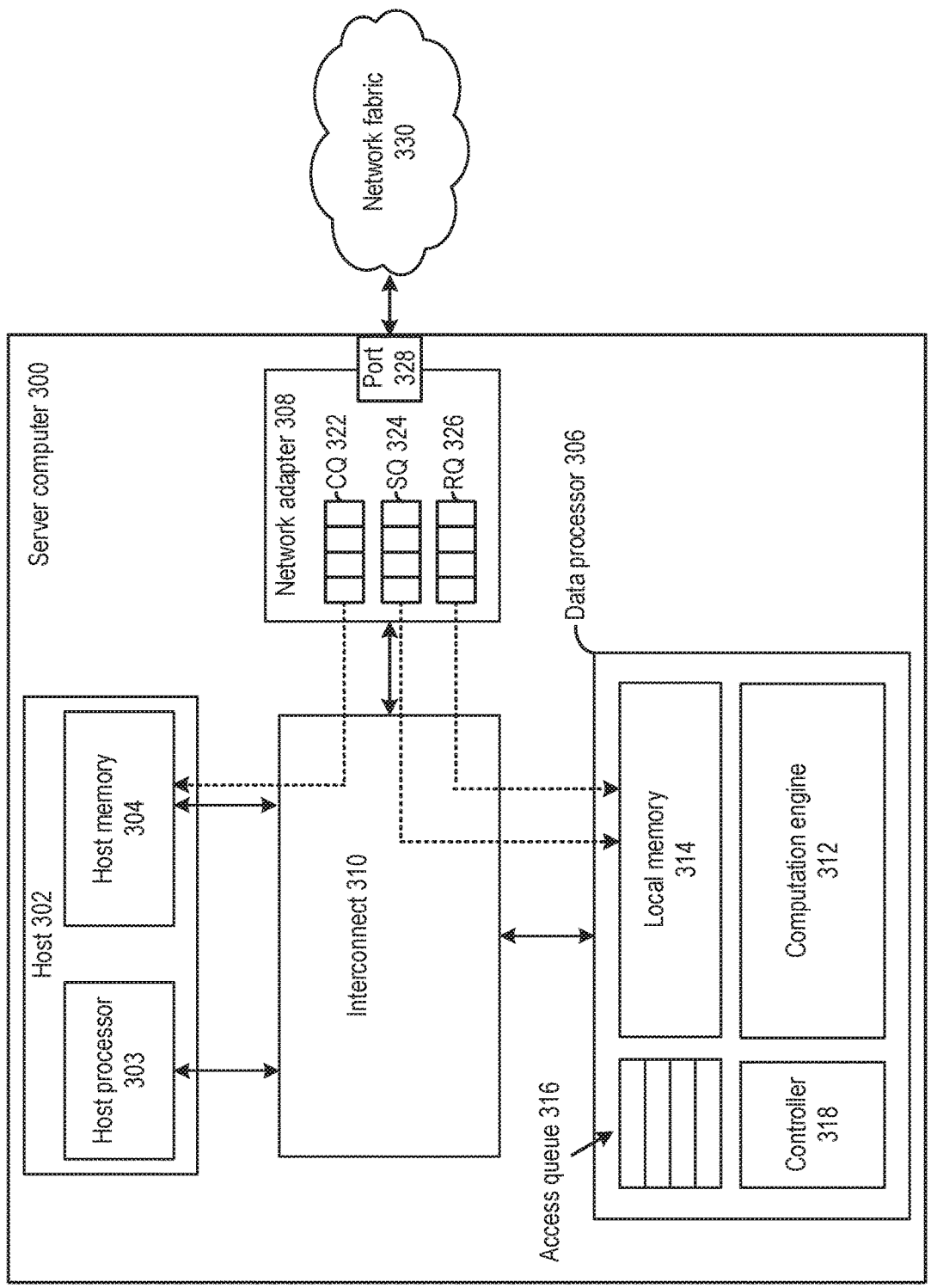
FIG. 3A, FIG. 3B, and FIG. 3C illustrate examples of a computing server that can use techniques of the present disclosure.
Figure 3B:
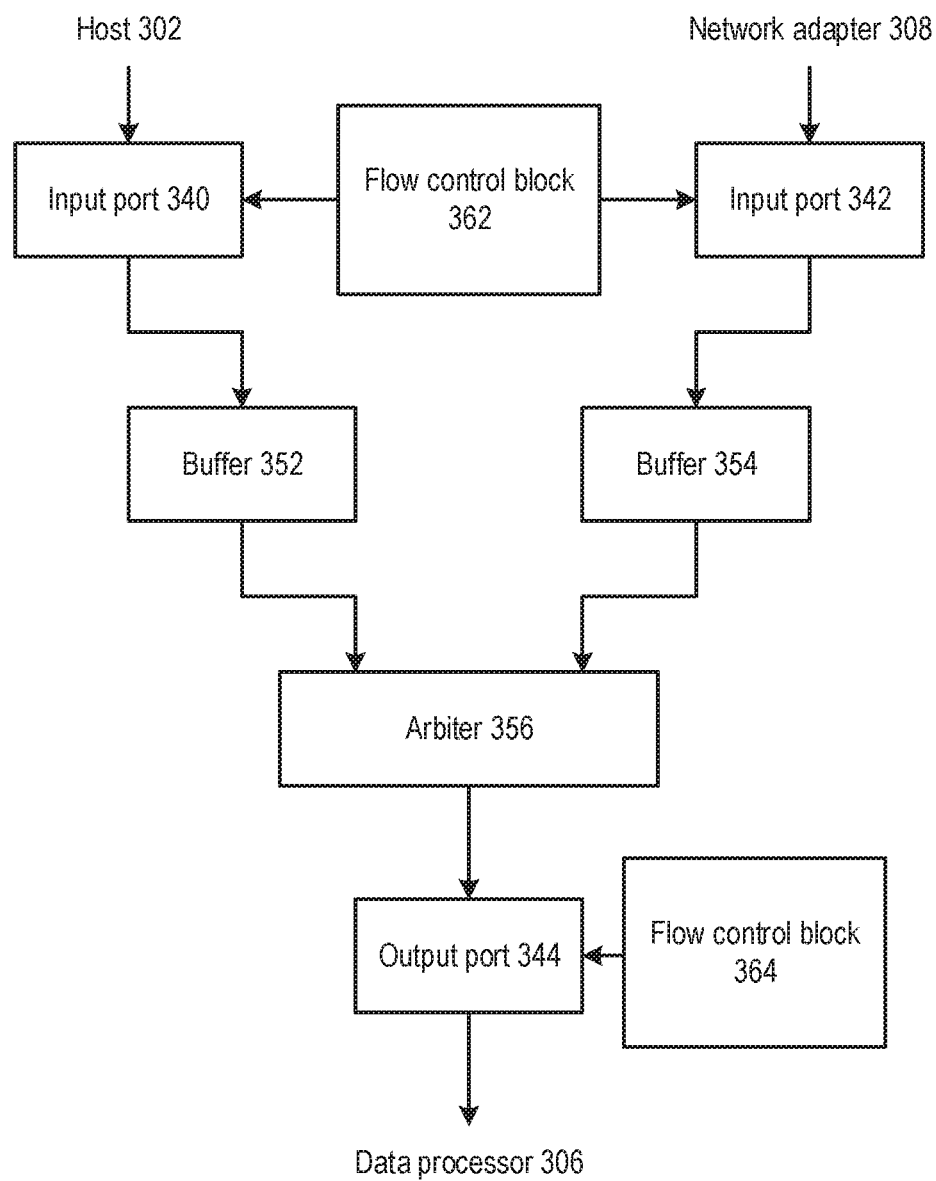

FIG. 3A and FIG. 3B illustrate an example of a server computer 300 that can implement communication stack 200. Referring to FIG. 3A, server computer 300 includes a host 302, which includes a host processor 303 and a host memory 304, a hardware data processor 306, and a network adapter 308. Host processor 303, host memory 304, hardware data processor 306, and network adapter 308 can be interconnected via an interconnect 310, such as a PCIE interconnect implemented as a root complex switch. Server computer 300 can implement any one of nodes 102a-h of FIG. 1A, where multiple server computers 300 can be interconnected to form computing cluster 100 of FIG. 1A.

Hardware data processor 306 can include a computing engine 312 to provide dedicated computing resources to support certain data processing applications. In some examples, computing engine 312 may include a neural network hardware accelerator. Hardware data processor 306 also includes a local memory 314 to support computing engine 312. Local memory 314 can be accessible to network adapter 308 and host 302 via, for example, a DMA engine (not shown in the figures). Local memory 314 can include an on-chip or an off-chip memory, such as static random access memory (SRAM), dynamic random access memory (DRAM), high bandwidth memory (HBM), non-volatile memory such as storage class memory (SCM) and flash memory. In addition, hardware data processor 306 also includes one or more memory access queues 316 to store read and write requests to local memory 314. Each request can include a DMA descriptor to be executed by the DMA engine to perform a data transfer between local memory 314 and each of network adapter 308 and host 302. Hardware data processor 306 further includes a controller 318 to manage the operations of computation engine 312, local memory 314, and access queue 316. For example, controller 318 can fetch and execute the read/write requests to local memory 314 from access queue 316, control the time when computation engine 312 fetches or stores data at local memory 314, and so on. Controller 318 can also communicate with each of host 302 and network adapter 308, and manage the operations of computation engine 312, local memory 314, and access queue 316 based on the communication.

Host processor 303 of host 302 can execute an operating system kernel as well as other applications that uses the computation resources provided by hardware data processor 306. For example, host processor 303 can execute a training application that controls hardware data processor 306 to perform batches of distributed training operation 140. As another example, host processor 303 can execute an image recognition application that uses hardware data processor 306 to perform an inferencing operation using a neural network with weights obtained from distributed training operation 140. In addition, host memory 304 provides memory resources to support the operation of host processor 303 as well as hardware data processor 306. For example, host memory 304 can store the input training data, the input data for the inference operation, etc., and supply the data to hardware data processor 306 via, for example, DMA operations. Host memory 304 can include an on-chip or an off-chip memory, such as SRAM, DRAM, HBM, non-volatile memory such as storage class SCM and flash memory.

Network adapter 308 can include similar components of network adapter 208a/b of FIG. 2 to implement communication stack 200. Specifically, network adapter 308 can include a physical port 328 that connects network adapter 308 to network fabric 330, from which network adapter 308 can receive packets. Network adapter 308 further includes a completion queue (CQ) 322, a send queue (SQ) 324, and a receive queue (RQ) 326, which can operate the same way as completion queues 215, send queues 212, and receive queues 214 of FIG. 2. For example, when network adapter 308 receives a set of packets for a transaction from network fabric 330, network adapter 308 can store a work queue element (WQE) including/representing the message data of the transaction, which are extracted from the packets, in receive queue 326. In a case where the message data are targeted at hardware data processor 306 (e.g., weigh gradients from other worker nodes), network adapter 308 can then send a set of write requests, as well as the message data, to hardware data processor 306 via interconnect 310. Hardware data processor 306 can then buffer the write requests in access queue 316 and execute the write requests to write the message data into local memory 314. For a transaction to send data (e.g., weight gradients) out of hardware data processor 306, a WQE element can also be posted in send queue 324, for which network adapter 308 transmits read requests to hardware data processor 306 to fetch the data from local memory 314. Network adapter 308 can then assemble packets from the fetched data and send the packets via port 328 to network fabric 330. As network adapter 308 transmits the packet data directly to hardware data processor 306 to perform the computations, without the packet data being processed by host 302, the latency in delivering the data to hardware data processor 306 can be reduced.

In addition, after network adapter 308 completes the transmission of the write requests to hardware data processor 306, network adapter 308 can store a transfer complete message—such as a completion queue element (CQE), in completion queue 322.

The transfer complete message can indicate that network adapter has initiated the transfer of data to hardware data processor via the interconnect. The CQE can also indicate that a transfer of data for the transaction has been completed from the perspective of the network adapter. The CQE can also include other information, such as a status of reception/transmission of packets (e.g., whether there are missing packets, whether the packets contain data error). In some examples, network adapter 308 can also store the CQE at host memory 304 (e.g., via a DMA operation), to notify the application executing at host processor 303 that the transaction has been completed and the data has been transferred to hardware data processor 306. The notification allows the host processor 303 to instruct hardware data processor 306 to start the processing of the data, or not to process the data. For example, in a case of a training operation, host processor 303 can instruct hardware data processor 306 to start updating the weights based on the weight gradients received from network adapter 308. In a case where the CQE indicates missing or corrupted data, the host processor can also control hardware data processor 306 not to perform the computation operation on the data.

In some examples, completion queue 322, as well as send queue 324 and receive queue 326, can be address mapped to, respectively, host memory 304 and local memory 314. Specifically, each of completion queue 322, send queue 324, and receive queue 326 can be implemented at a local memory of network adapter 308 (not shown in FIG. 3A) and each can be associated with a base address. The base address of completion queue 322 can be mapped to a base address of a region of host memory 304 allocated to receive CQE, whereas the base addresses of send queue 324 and receive queue 326 can be mapped to a base address of a region of local memory 314 allocated to handle the read/write requests. In a case where interconnect 310 is based on the PCIe specification, the base addresses of host memory 304 and local memory 314 can be stored in Base Address Registers (BARs) and mapped to the base addresses of the queues. In some examples, send queue 324 and receive queue 326 can also be mapped to host memory 304, in a case where host 302 controls the sending and reception of packets at network adapter 308.

FIG. 3B illustrates an example of internal components of interconnect 310 which can be implemented as a root-complex switch. As described above, interconnect 310 can provide connectivity among host 302, network adapter 308, and hardware data processor 306. As shown in FIG. 3B, interconnect 310 includes multiple ports such as, for example, an input port 340, an input port 342, and an output port 344. Input port 340 can be connected to host 302, input port 342 can be connected to network adapter 308, whereas output port 344 can be connected to hardware data processor 306. Arbiter 356 can select, based on any arbitration algorithm (e.g., a round-robin scheme), the order by which input ports 340 and 342 forward data to output port 344. Through input ports 342 and 344, arbiter 356, and output port 344, both host 302 and network adapter 308 can transmit data to hardware data processor 306, albeit at different times.

In addition, interconnect 310 includes flow control blocks 362 and 364, as well as buffers 352 and 354 to implement a flow control mechanism. The flow control mechanism may be implemented to, for example, police/shape the volume of communication traffic from host processor 303 and network adapter 308 into hardware data processor 306, to prevent any one of host processor 303 or network adapter 308 from dominating the transmission of data to hardware data processor 306. To support the traffic shaping, flow control block 362 can implement, for example, a credit system to keep track of a volume of data that has flown through each of input port 340 and 342. Flow control block 362 can stop an input port from letting data into interconnect 310 if the input port runs out of the requisite credit to transmit the data. In addition, output port 344 is controlled by flow control block 364. Flow control block 364 can also implement a credit system to limit the rate at which hardware data processor 306 receives data through output port 344. The flow control at output port 344 can be arranged to accommodate, for example, bandwidth/speed limitation of local memory 314 of hardware data processor 306. Buffers 352 and 354 can buffer data received from, respectively, input ports 340 and 342 while the data are gated from output port 344 by flow control block 364 and/or arbiter 356.

Figure 3C:
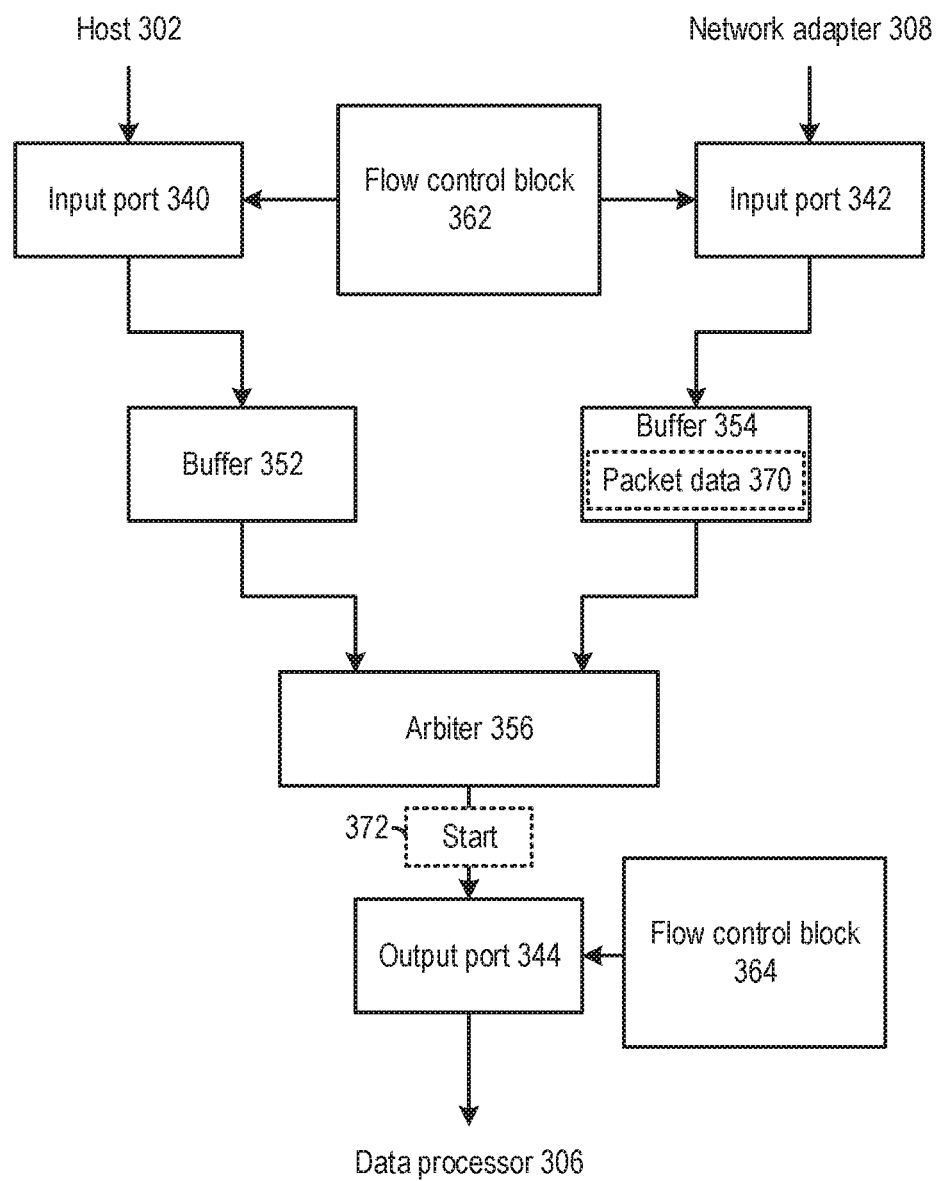

Although the RDMA protocol implemented in computing system 300 can reduce the data transfer latency between network adapter 308 and hardware data processor 306, data coherency issues may arise due to the flow control and arbitration operations at interconnect 310. Specifically, after network adapter 308 transmits write requests of packet data 370 to hardware data processor 306, network adapter 308 can post a CQE in completion queue 322, which causes host 302 to send a start signal 372 to hardware data processor 306 to start a computation operation based on the packet data. But the start signal may arrive at hardware data processor 306 prior to all of the packet data being written into local memory of hardware data processor 306. Referring to FIG. 3C, some or all of packet data 370, received from network adapter 308 via input port 342, may remain in buffer 354 while start signal 372, received from host 302 via input port 340, is transmitted through output port 344 to hardware data processor 306. This can be due to, for example, input port 342 running out of credit, which delays the forwarding of the packet data to output port 344. As another example, even if packet data 370 and start signal 372 reach arbiter 356 at the same time, arbiter 356 may select to first forward start signal 372, followed by packet data 370, to hardware data processor 306.

Having start signal 372 transmitted to hardware data processor 306 prior to packet data 370 can lead to data coherency issues. Specifically, start signal 372 can control hardware data processor 306 to start a computation operation on packet data 370, but since packet data 370 are not yet stored at local memory 314, the computation operation is not performed on packet data 370. Instead, the computation operation may be performed on an incomplete set of packet data 370, or even based on other stale data stored at local memory 314, leading to incorrect computation results.

Figure 4A:
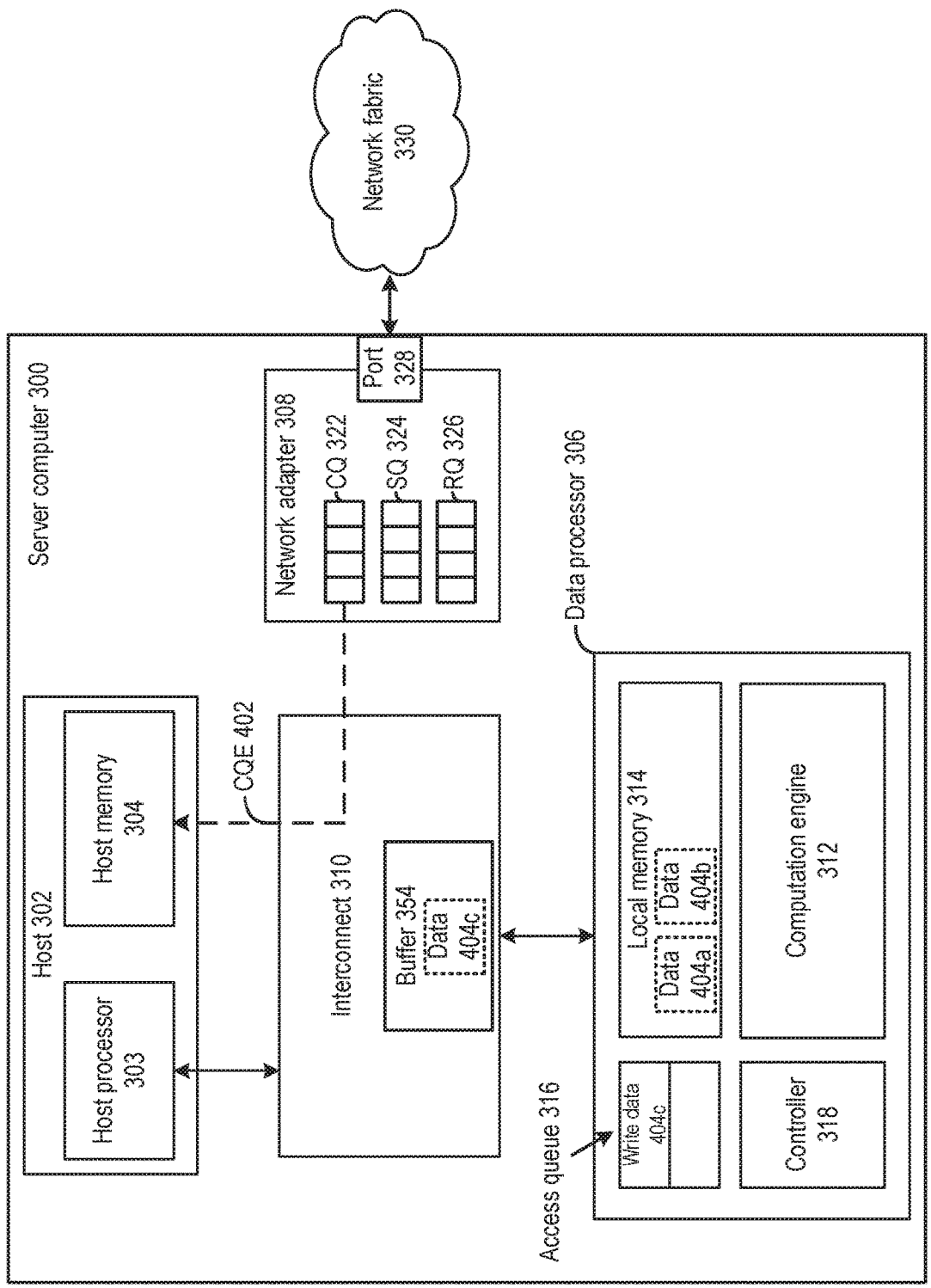
FIG. 4A, FIG. 4B, FIG. 4C, FIG. 4D, and FIG. 4E illustrate examples of a data synchronization operation performed by the example computing server of FIG. 3A-FIG. 3C.

To ensure data coherency, a multi-step data synchronization operation involving host 302, hardware data processor 306, and network adapter 308 can be performed. FIG. 4A-FIG. 4E illustrate an example of a data synchronization operation. Referring to FIG. 4A, as a first step of the data synchronization operation, host 302 can first receive a CQE 402 from network adapter 308, which indicates that the transfer of a pre-determined set of data 404a, 404b, and 404c of a transaction to local memory 314 of hardware data processor 306 has been initiated. Network adapter 308 can send CQE 402 to host 302 by, for example, writing CQE 402 at host memory 304 via a DMA operation, which can be performed based on an address mapping between completion queue 322 and host memory 304. Host memory 304 may maintain a copy of completion queue 322 for host 302, and CQE 402 can be stored in the copy of completion queue 322 of host memory 304. On the other hand, when CQE 402 is sent to host 302, data 404c remains buffered in buffer 354 of interconnect 310, while access queue 316 stores an outstanding write request to write data 404c to local memory 314.

Figure 4B:
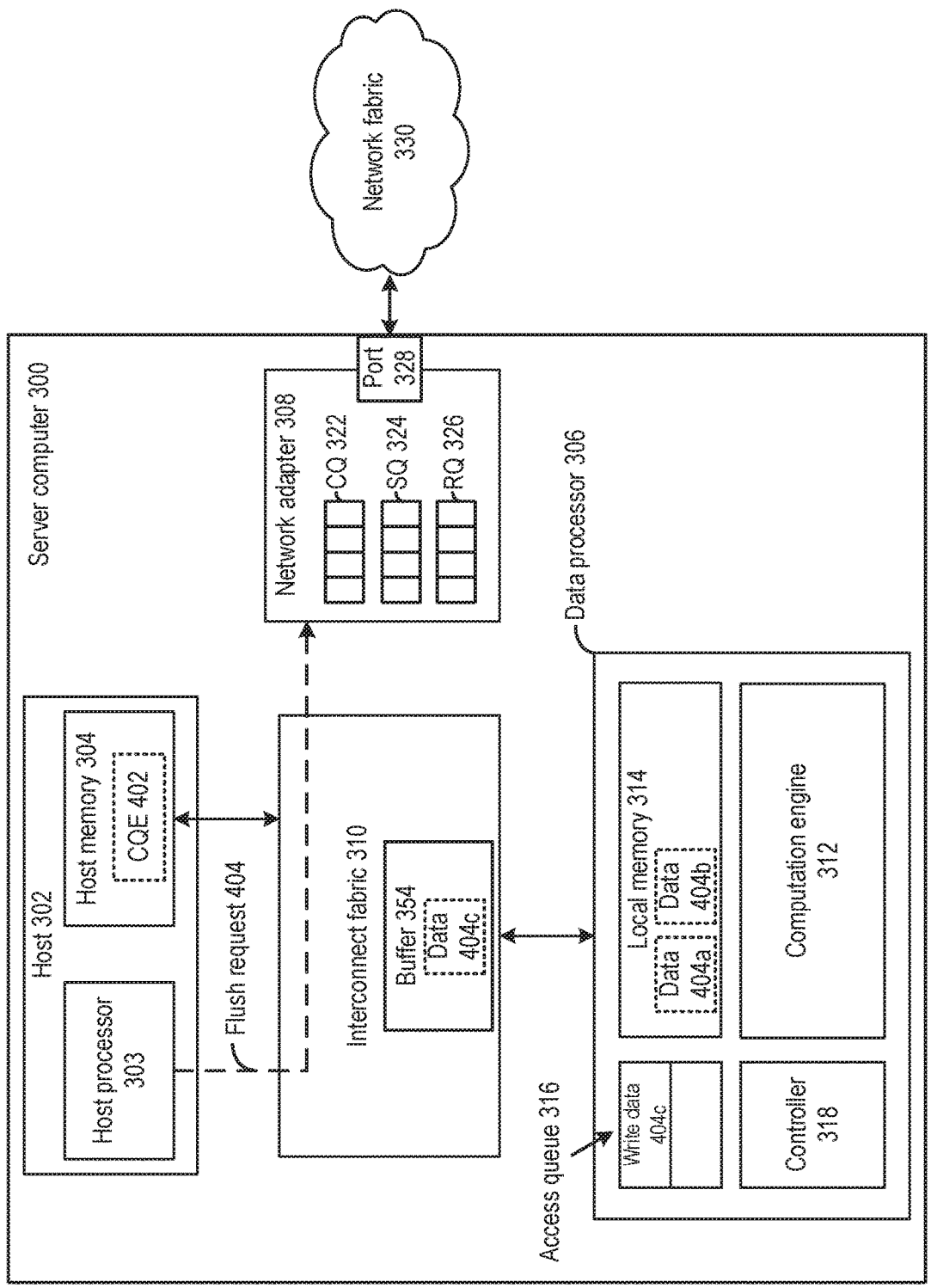

Referring to FIG. 4B, to ensure that the entire set of data 404a-404c has been written into local memory 314 before computation engine 312 begins a computation operation, the host processor may perform a second step of the data synchronization operation upon receiving CQE 402 from network adapter 308. As the second step of the data synchronization operation, host processor transmits a flush request 404 to network adapter 308 to perform a flush operation.

Figure 4C:
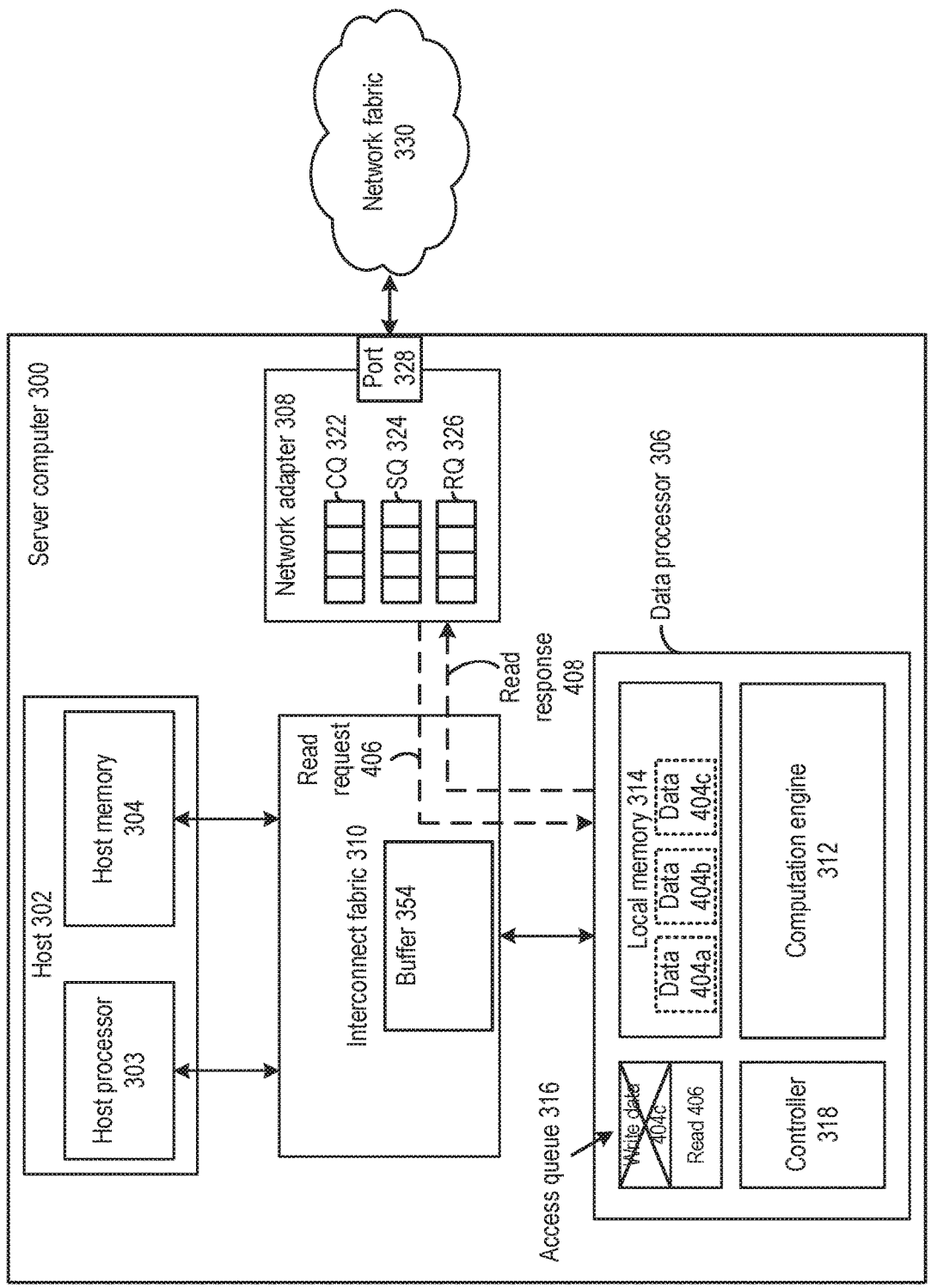

Referring to FIG. 4C, as a third step of the data synchronization operation, network adapter 308 can transmit a read request 406 (e.g., a PCIE read) to read from local memory 314 of hardware data processor 306 to perform the flush operation. Hardware data processor 306 can buffer read request 406 in access queue 316. Upon receiving read request 406, controller 318 can complete (and flush) all of the outstanding write requests received before the read request, including the write request to fetch data 404c. As a result of the flushing operation, local memory 314 of hardware data processor 306 can store the full set of data 404a-404c of the transaction. After the flushing operation completes, the hardware data processor can transmit a read response 408 back to the network adapter as a third step of the synchronization operation. Read response 408 may include, for example, data 404a-404c, and/or an indication that the outstanding write requests have been executed.

Figure 4D:
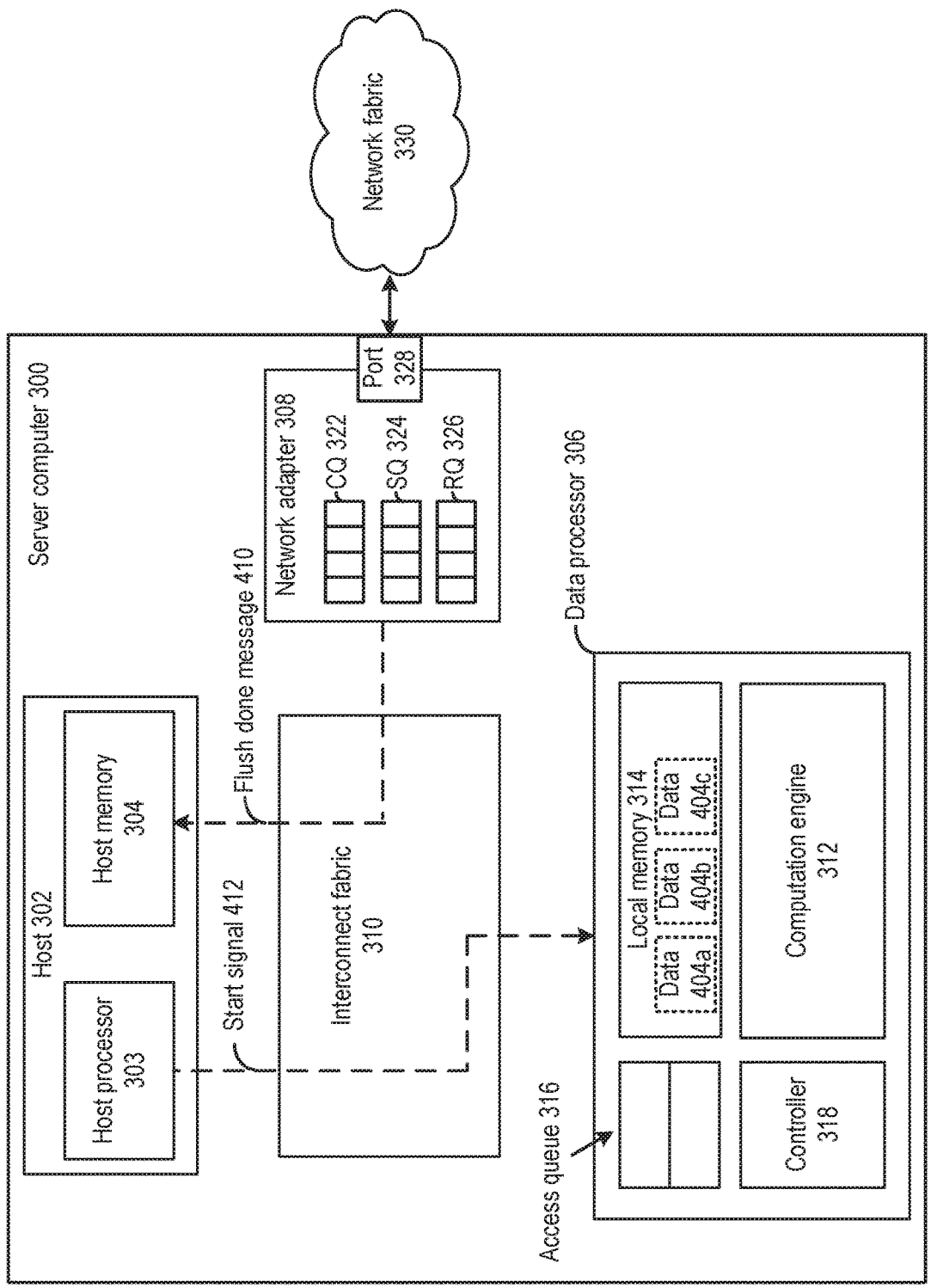

Referring to FIG. 4D, as a fourth step of the synchronization operation, network adapter 308 can transmit a flush done message 410 indication to indicate that the flush operation at the hardware data processor completes to the host processor. Network adapter 308 can transmit flush done message 410 by, for example, writing the message into host memory 304 via a DMA operation. After receiving flush done message 410, host processor 303 can transmit a start signal 412 to hardware data processor 306. Upon receiving start signal 412, controller 318 can control computation engine 312 to fetch data 404a-404c from local memory 314 and to start a computation operation based on the data.

Figure 4E:
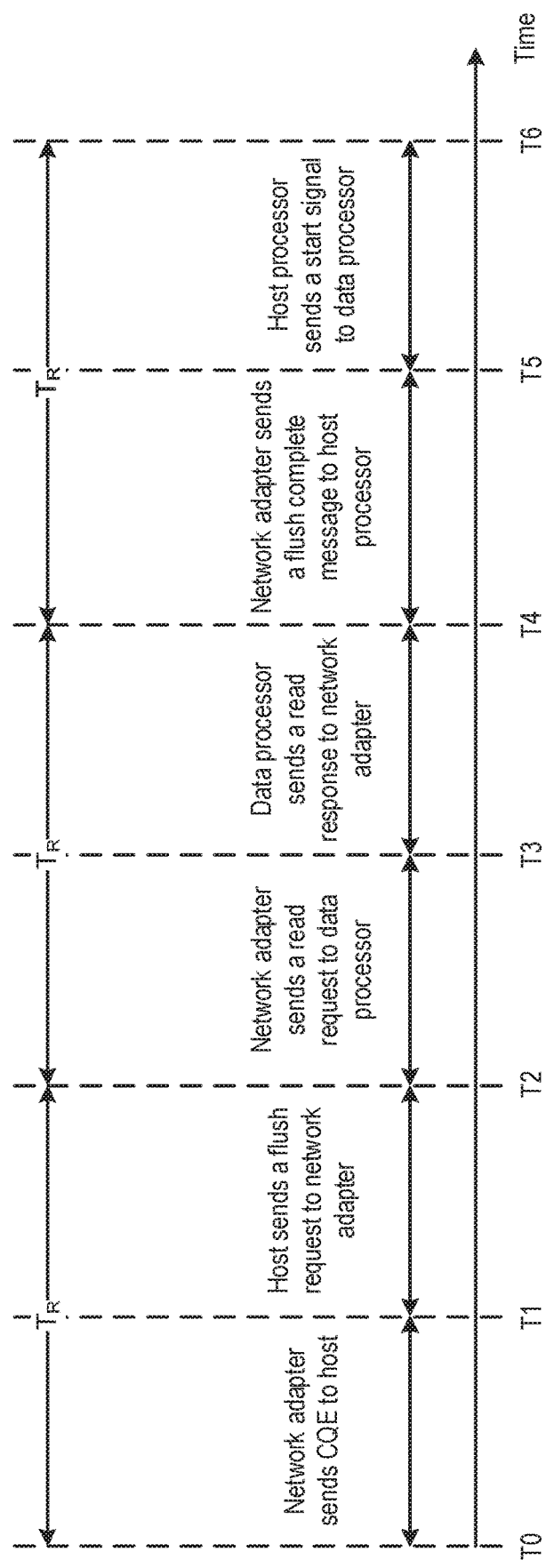

The multi-step data synchronization operation described above can ensure that the hardware data processor can withhold a computation operation until the host processor confirms that the full set of packets of a transaction has been stored at the local memory of the hardware data processor. This can reduce the likelihood of the hardware data processor operating on an incomplete set of data, or a set of stale data, which can ensure data coherency. However, the data synchronization operation involves an exchange of messages between the host processor and the network adapter, and an exchange of messages between the network adapter and the hardware data processor. As each exchange of messages incurs a considerable round-trip delay, the transmission latencies can add up and slow down the data synchronization operations. FIG. 4E illustrates an example timing diagram 420 of the multi-step data synchronization operation of FIG. 4A-FIG. 4D. As shown in FIG. 4E, assuming that the round-trip delay between hardware data processor 306 and each of network adapter 308 and host 302 is the same (labeled TR in FIG. 4D), the total time incurred by the multi-step data synchronization operation, between times T0 and T6, can include three round-trip delays 3×TR. This can also substantially increase the overall time of the computation operations at the hardware data processor, especially in a distributed training operation where a worker node needs to exchange weight gradients with each of other worker nodes in multiple transactions over the network, as each transaction may require a repeat of the multi-step data synchronization and incur three round-trip delays. The overall performance of the distributed computing system can become degraded as a result.

Figure 5A:
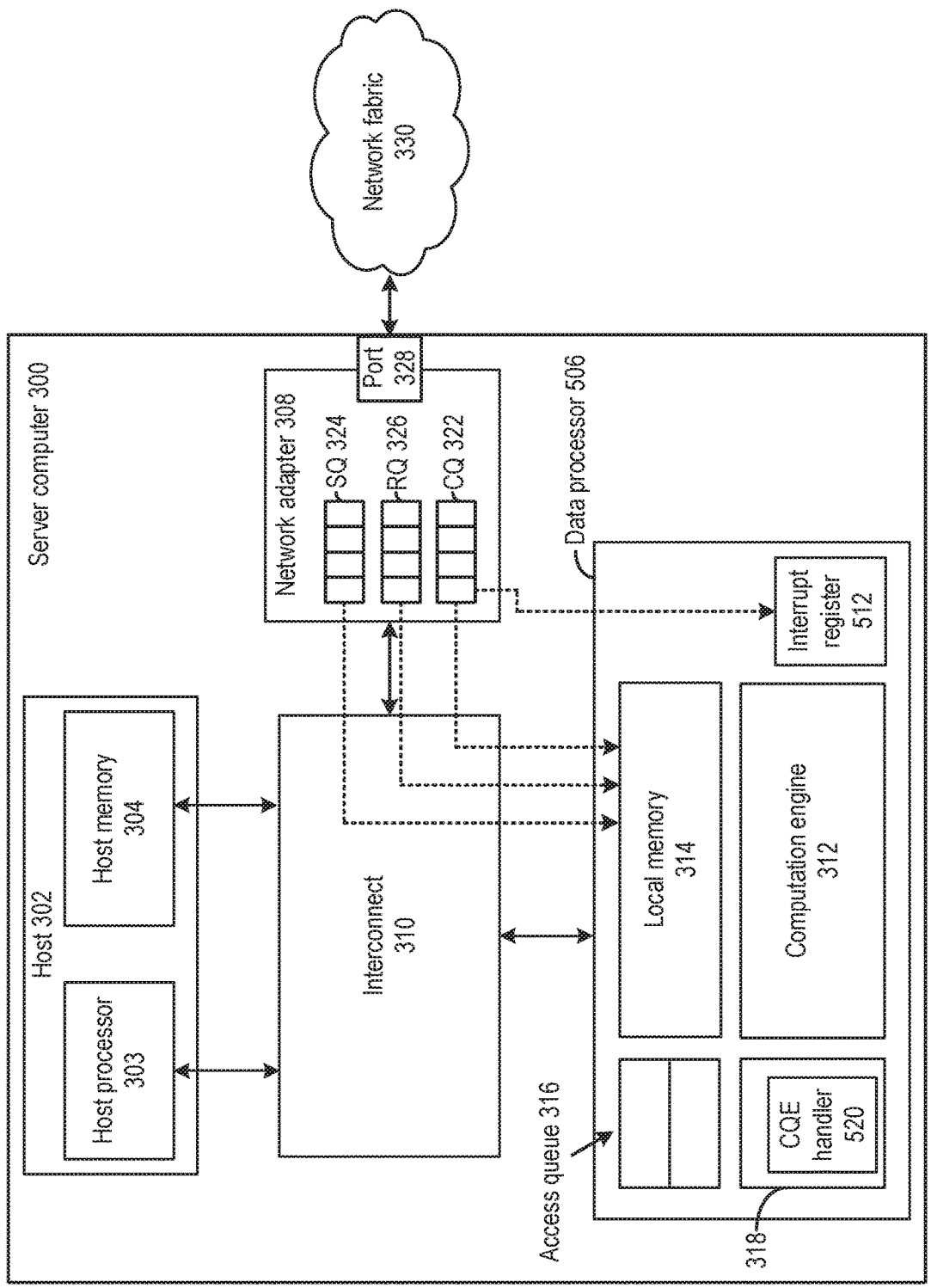

FIG. 5A illustrates an example of a server computer 500 that implements a data synchronization operation having a reduced number of message exchanges, which leads to a reduced latency. Referring to FIG. 5A, server computer 300 includes host 302, which includes host processor 303 and host memory 304 as in FIG. 3A, network adapter 308, and a hardware data processor 506. Host processor 303, host memory 304, hardware data processor 506, and network adapter 308 can be interconnected via an interconnect 310, which can be a Peripheral Component Interconnect Express (PCIE)) interconnect implemented as a root complex switch.

Network adapter 308 can implement communication stack 200 and includes completion queue (CQ) 322, send queue (SQ) 324, and receive queue (RQ) 326 as in FIG. 3A. Network adapter 308 can write a work queue element (WQE) into receive queue 326 upon receiving packets of a receive transaction from network fabric 330, and write a WQE into send queue 324 upon receiving data of a send transaction from hardware data processor 506. Both send queue 324 and receive queue 326 can be address mapped to the local memory of hardware data processor 506, which allows network adapter 308 to send data to or receive data from local memory 314 of hardware data processor 506 via DMA operations over interconnect 310. After completing a transaction posted in send queue 324 or receive queue 326, network adapter 308 can post a completion queue element (CQE) in completion queue 322.

After posting a CQE in completion queue 322, as part of a data synchronization operation network adapter 308 can transmit the CQE to hardware data processor 506 to cause hardware data processor 506 to perform a flush operation. After hardware data processor 506 completes the flush operation, hardware data processor 506 may transmit the CQE (or other messages) to host 302 to indicate that the flush operation has completed. Host 302 may then transmits a start signal, such as start signal 412 of FIG. 4D, to start a computation operation. As to be described below, such arrangements can reduce the number of message exchanges among host 302, network adapter 308, and hardware data processor 506, which can reduce the latency of the data synchronization operation.

There are various ways by which network adapter 308 transmits the CQE to hardware data processor 506. For example, as shown in FIG. 5A, completion queue 322 of network adapter 308 can also be address mapped to the local memory of hardware data processor 506, as for send queue 324 and receive queue 326. In a case where interconnect 310 is based on the PCIE specification, the base address of local memory 314 can be stored in a Base Address Register (BAR) and can be mapped to the base address of completion queue 322. Through the mapping of base addresses, network adapter 308 can transmit a write request to store the CQE at local memory 314 of hardware data processor 506 via a DMA operation over interconnect 310. In some examples, completion queue 322 of network adapter 308 can be mapped to an interrupt register 512 of hardware data processor 506, which allows network adapter 308 to announce a CQE by transmitting an interrupt signal to interrupt register 512 of hardware data processor 506.

In addition, hardware data processor 506 includes computing engine 312, local memory 314, access queue 316, and controller 318 as in FIG. 3A. Hardware data processor 506 also includes a CQE handler 520 that can be implemented by controller 318. CQE handler 502 can handle the CQE transmitted by network adapter 308 (via write requests to local memory 314 or interrupt signal 514) by performing a flush operation. After the flushing operation completes, CQE handler 502 may also transmit the CQE to host 302 to trigger host 302 to send start signal 412, or control computation engine 312 to start a computation operation.

Figure 5B:
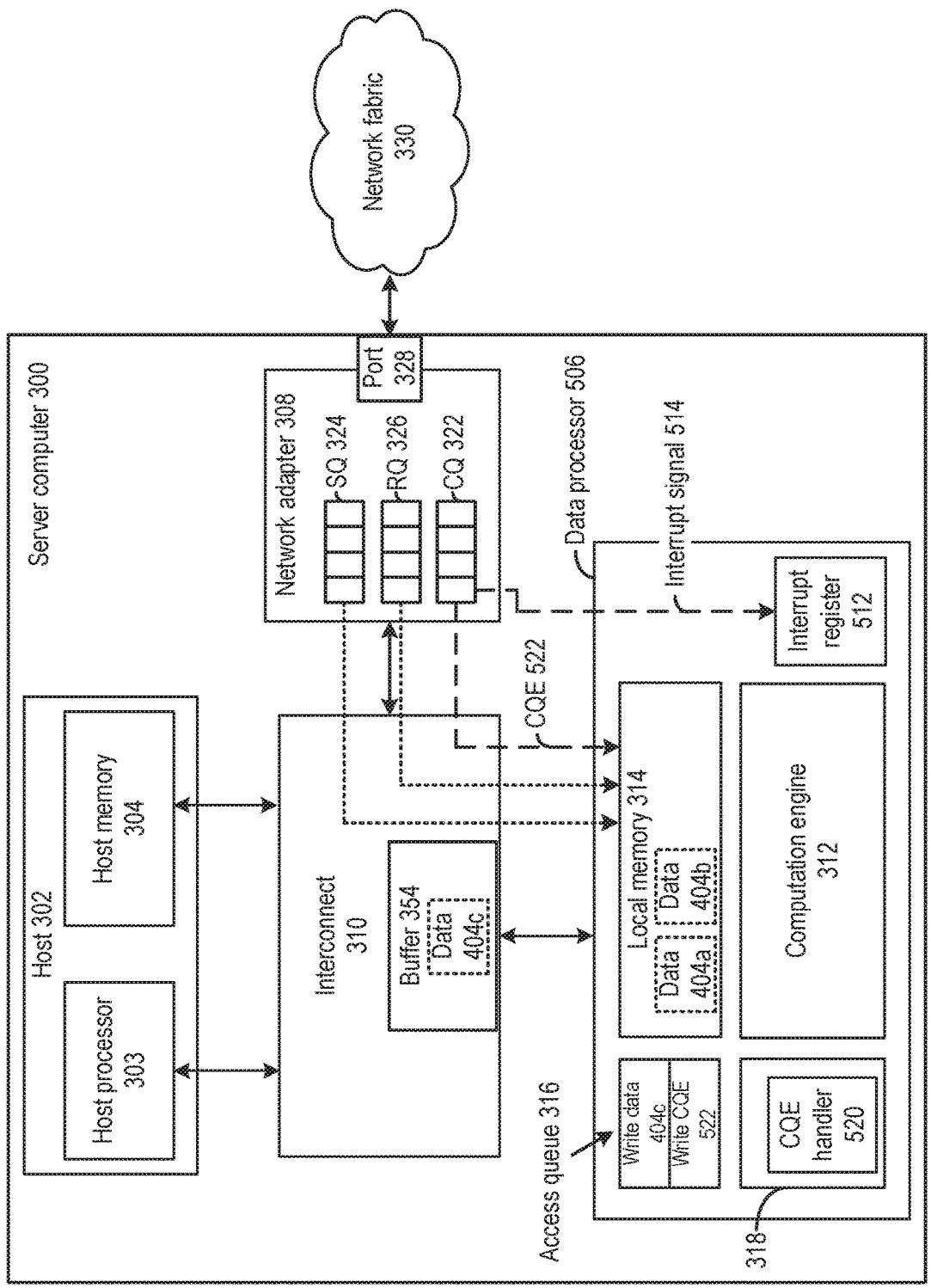

FIG. 5B-FIG. 5F illustrate an example sequence of data synchronization operation performed between host 302, network adapter 308, and CQE handler 502. Referring to FIG. 5B, as a first step of the data synchronization operation, hardware data processor 506 can receive a CQE 522 from network adapter 308, which indicates that the transfer of a pre-determined set of data 404a, 404b, and 404c of a transaction to local memory 314 of hardware data processor 306 has been initiated. When CQE 522 is sent to hardware data processor 506, data 404c remains buffered in buffer 354 of interconnect 310, while access queue 316 stores an outstanding write request to write data 404c to local memory 314. Network adapter 308 can send CQE 522 by, for example, transmitting a write request to write CQE 522 into local memory 314, and the write request can be stored in access queue 316 behind the outstanding write request to write data 404c. As another example, network adapter 308 can also transmit an interrupt signal 514 to interrupt register 512 of hardware data processor 506, to announce the generation of CQE 522.

Referring to FIG. 5C, as a second step of the data synchronization operation, upon detecting the write request to write CQE 522 and/or interrupt signal 514, CQE handler 520 can perform a flush operation. As part of the flush operation, CQE handler 520 completes (and flushes) all outstanding write requests in front of the CQE write request in access queue 316 to perform the flush operation. To complete the write requests, hardware data processor 506 can fetch data 404c from buffer 354 of interconnect 310 into local memory 314 via a DMA operation. As a result of the flushing operation, local memory 314 of hardware data processor 306 can store the full set of data 404a-404c of the transaction.

Figure 5D:
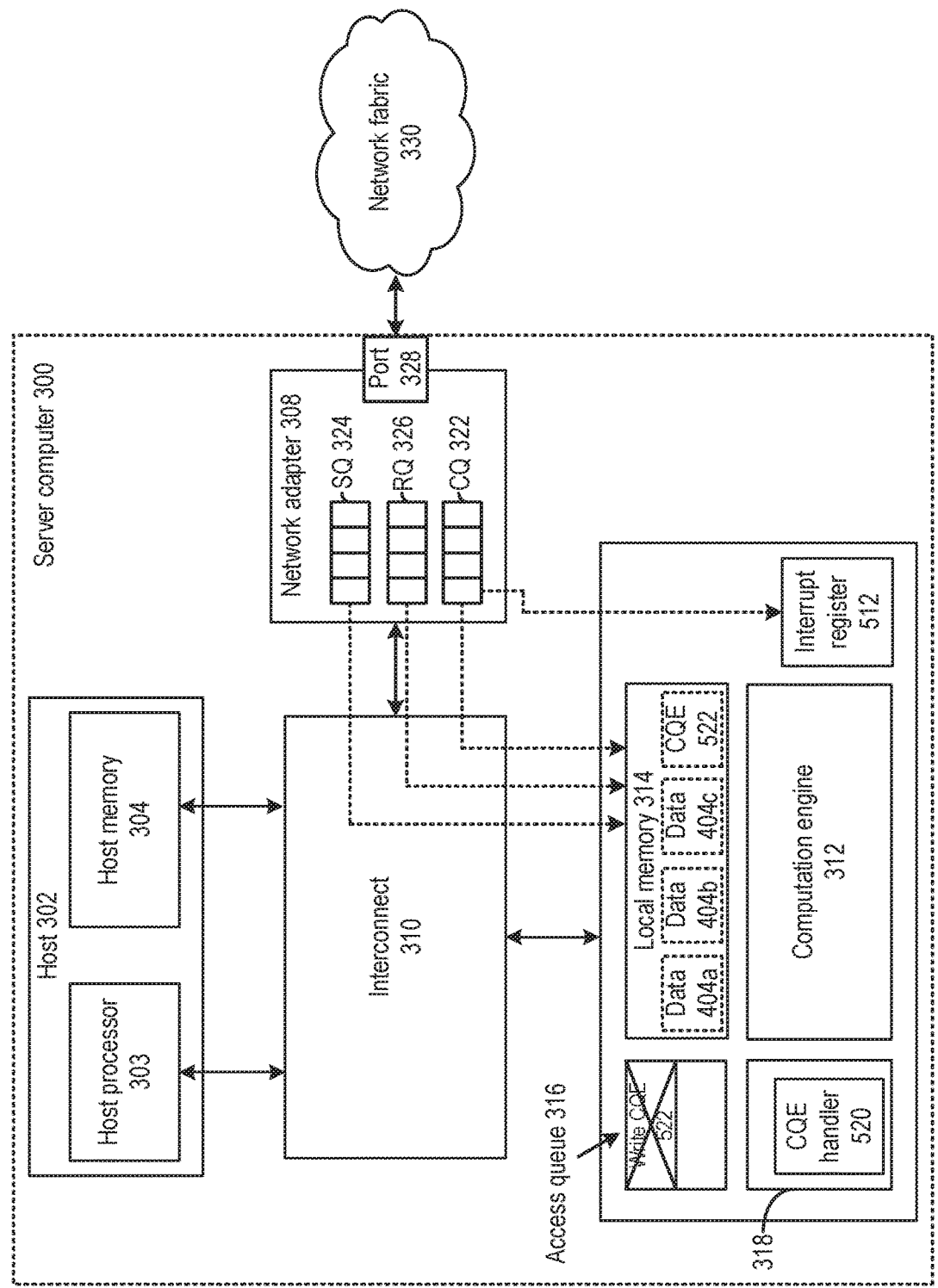

Referring to FIG. 5D, after writing data 404c into local memory 314, CQE handler 520 can complete the write request to write CQE 522 into local memory 314, as a third step of the data synchronization operation.

Figure 5E:
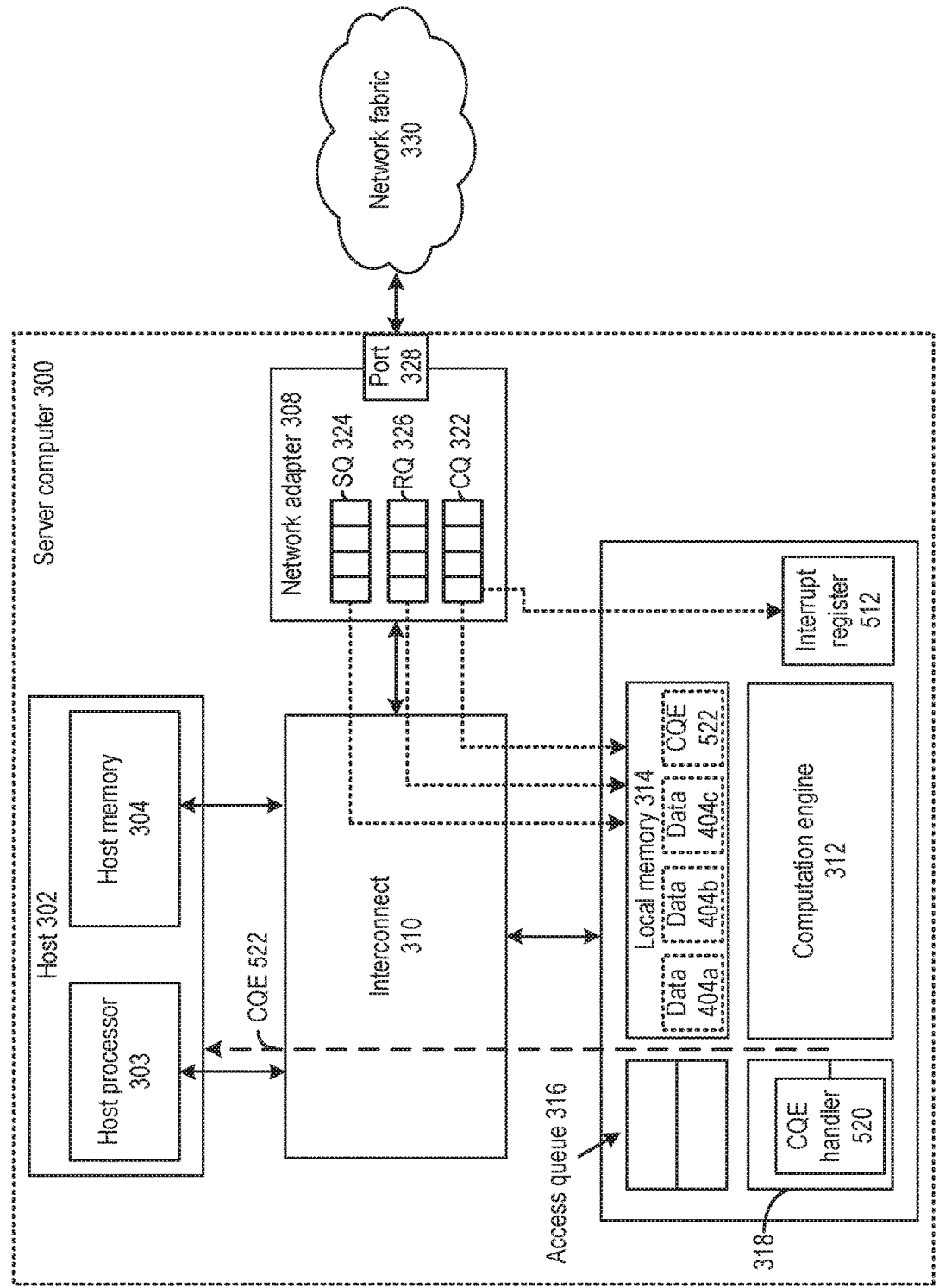

Upon detecting that CQE 522 has been written into local memory 314, CQE handler 520 can perform one or more actions. In one example, as shown in FIG. 5E, CQE handler 520 can transmit CQE 522 to host 302. The transmission can be based on, for example, writing CQE 522 into host memory 304 via a DMA operation over interconnect 310. As described above, host memory 304 can maintain a copy of completion queue 322, and CQE 522 can be stored in the copy of completion queue 322 of host memory 304. As another example, CQE handler 520 can transmit an interrupt signal to an interrupt register of host 302 (not shown in FIG. 5E), etc. Upon receiving CQE 522, host 302 can then transmit start signal 412 to hardware data processor 506 to start a computation operation based on data 404a-404c. In a case where CQE 522 indicates missing or corrupted data, host 302 can also control hardware data processor 506 not to perform the computation operation on the data (e.g., based on not transmitting start signal 412, or transmitting a stop signal). In another example, CQE handler 520 may start the computation operation at computation engine 312 based on data 404a-404c, upon detecting that CQE 522 has been written into local memory 314 and that CQE 522 indicate no data error and no missing data, to further reduce the latency of the data synchronization operation and to further speed up the computation operations at computation engine 312. In such example, CQE handler 520 may or may not send CQE 522 to host 302. In a case where CQE 522 indicates missing or corrupted data, CQE handler 520 can also control hardware data processor 506 not to perform the computation operation on the data. CQE handler 520 may also transmit an error indication (which may include CQE 522) to host 302.

Figure 5F:
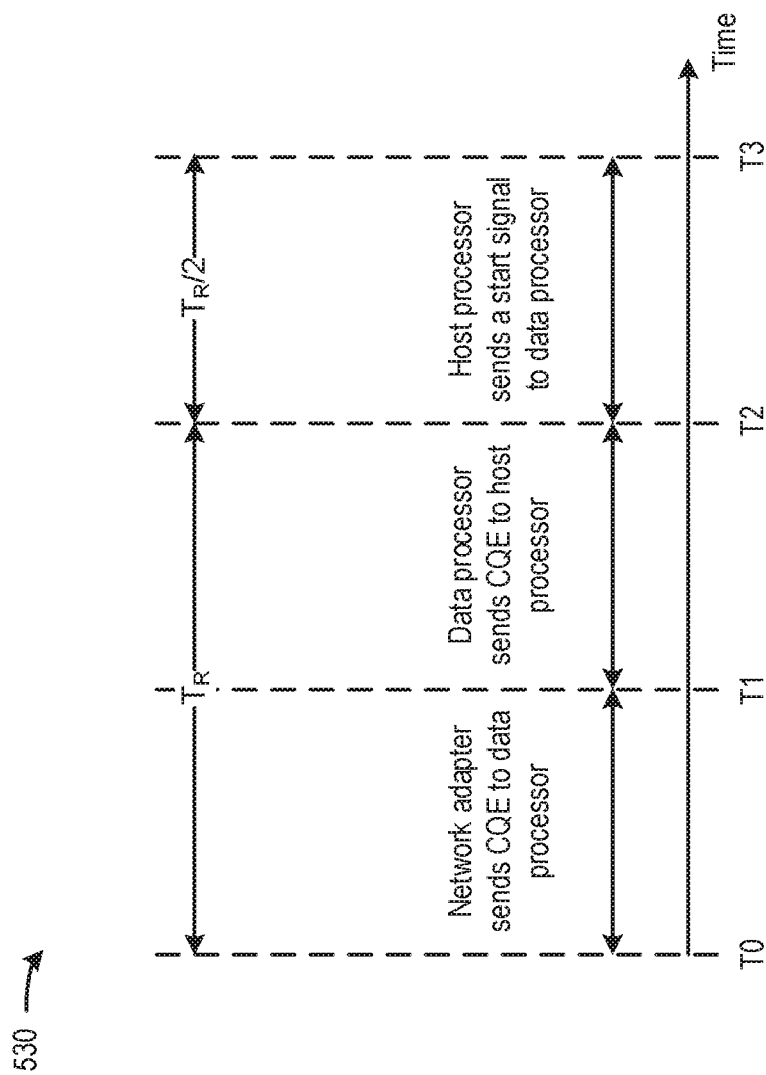

With the data synchronization operation of FIG. 5A-FIG. 5E, hardware data processor 506 can start a computation operation on data from the local memory only after completing the flushing operation, which can ensure data coherency for the computation operation. On the other hand, as the data synchronization operation mostly involves the transmission of CQE in a single direction (e.g., from network adapter to the hardware data processor, and optionally from the hardware data processor to the host processor) and does not involve multiple exchanges of messages, the transmission latencies incurred by the transmission of CQE can be reduced, which can speed up the data synchronization operation. FIG. 5F illustrates an example timing diagram 530 of the multi-step data synchronization operation of FIG. 5A-FIG. 5E. As shown in FIG. 5F, assuming that the round-trip delay between hardware data processor 506 and each of network adapter 308 and host 302 is the same (labelled TR in FIG. 5F), the total time incurred by the multi-step data synchronization operation, between times T0 and T3, can include one and a half round-trip delays 1.5×TR. Compared with FIG. 4E, the latency incurred by the multi-step data synchronization operation can be reduced by half. The speeding up of the data synchronization operations is especially critical for a distributed system where a computing device needs to perform multiple transactions over the network with other computing devices, and where a data synchronization operation is performed for each transaction. As a result, the performance of the distributed system in handling a distributed computation operation, such as a training operation of a neural network, can be substantially improved.

Figure 6:
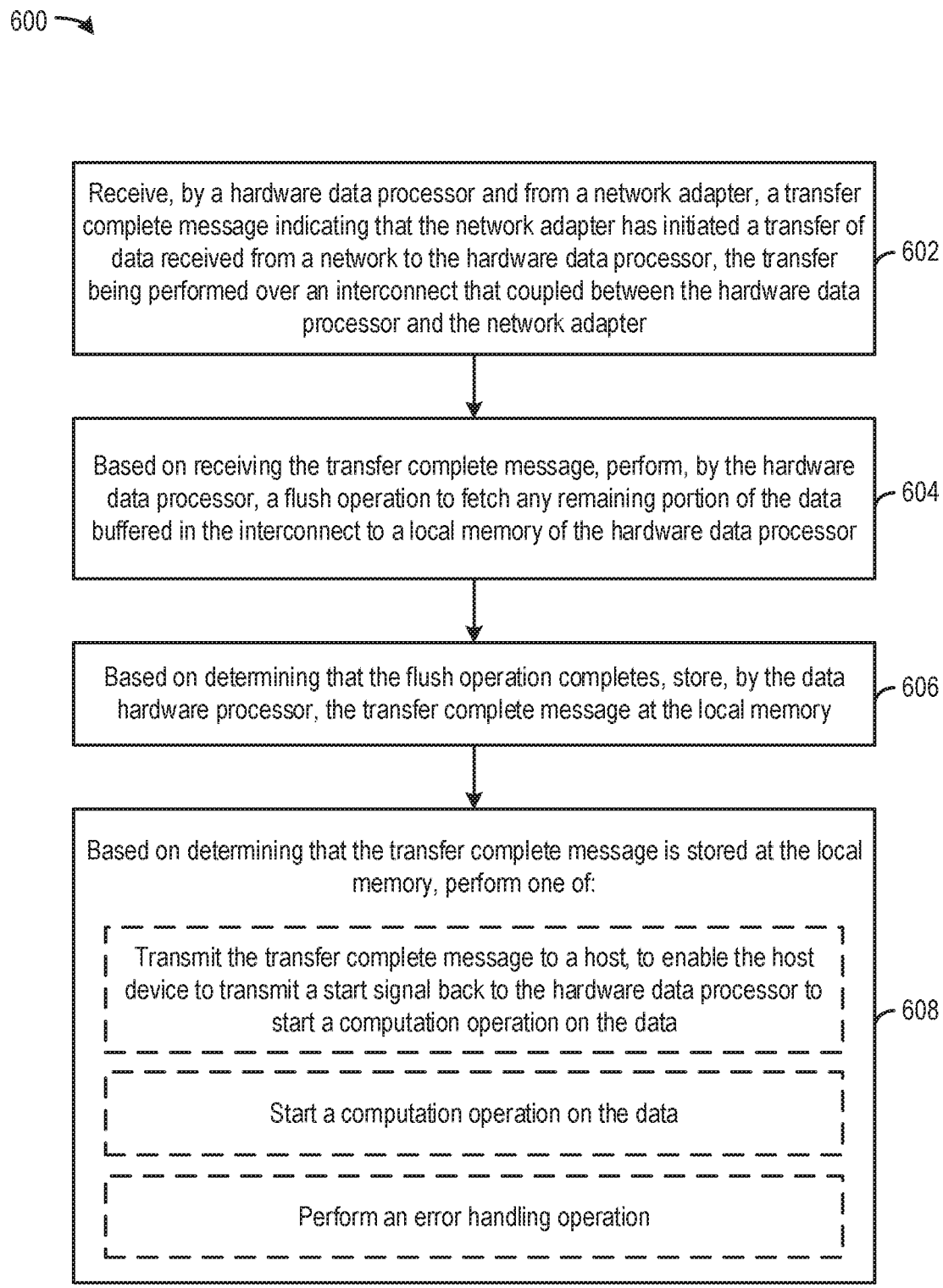
FIG. 6 illustrates an example of a method of performing a data synchronization operation, according to examples of the present disclosure.

FIG. 6 illustrates a method 600 of performing data synchronization at a computing device, such as server computer 300 of FIG. 5A, which can be part of a node of computing cluster 100. Referring to FIG. 5A, server computer 300 includes host 302, which includes host processor 303 and host memory 304 as in FIG. 3A, network adapter 308, and a hardware data processor 506. Host processor 303, host memory 304, hardware data processor 506, and network adapter 308 can be interconnected via an interconnect 310, which can be a Peripheral Component Interconnect Express (PCIE)) interconnect implemented as a root complex switch. Network adapter 308 can implement communication stack 200 and includes completion queue (CQ) 322, send queue (SQ) 324, and receive queue (RQ) 326 as in FIG. 3A. Network adapter 308 can write a work queue element (WQE) into receive queue 326 upon receiving packets of a receive transaction from network fabric 330, and write a WQE into send queue 324 upon receiving data of a send transaction from hardware data processor 506. Both send queue 324 and receive queue 326 can be address mapped to the local memory of hardware data processor 506, which allows network adapter 308 to send data to or receive data from local memory 314 of hardware data processor 506 via DMA operations over interconnect 310. After completing a transaction posted in send queue 324 or receive queue 326, network adapter 308 can post a transfer complete message, such as a completion queue element (CQE), in completion queue 322.

Method 600 can be performed by various components of hardware data processor 506, including CQE handler 520. In step 602, hardware data processor 506 can receive, from network adapter 306, the transfer complete message (e.g., CQE). The transfer complete message can indicate that the network adapter has initiated a transfer of data received from a network to the hardware data processor, the transfer being performed over an interconnect (e.g., interconnect 310) that coupled between the hardware data processor and the network adapter.

There are various ways by which hardware data processor 506 receives the transfer complete message from network adapter 306. For example, as shown in FIG. 5A, completion queue 322 of network adapter 308 can also be address mapped to the local memory of hardware data processor 506, as for send queue 324 and receive queue 326. In a case where interconnect 310 is based on the PCIE specification, the base address of local memory 314 can be stored in a Base Address Register (BAR) and can be mapped to the base address of completion queue 322. Through the mapping of base addresses, hardware data processor 506 can receive a write request to store the CQE at local memory 314 via a DMA operation over interconnect 310. In some examples, completion queue 322 of network adapter 308 can be mapped to an interrupt register 512 of hardware data processor 506, which allows network adapter 308 to announce a CQE by transmitting an interrupt signal to interrupt register 512 of hardware data processor 506. Hardware data processor 506 can then receive CQE based on receiving the interrupt signal at interrupt register 512.

In step 604, hardware data processor 506, based on receiving the transfer complete message, can perform a flush operation to fetch any remaining portion of the data buffered in the interconnect to a local memory of the hardware data processor. As part of the flush operation, hardware data processor (e.g., CQE handler 520) completes (and flushes) all outstanding write requests in front of the CQE write request in access queue 316 to perform the flush operation. To complete the write requests, hardware data processor 506 can fetch data remained in the buffer of the interconnect into the local memory of the hardware data processor via a DMA operation.

In step 606, hardware data processor 506, based on determining that the flush operation completes, store, by the data hardware processor, the transfer complete message at the local memory. The storing of the transfer complete message (CQE) can be based on completing the write request to write the CQE into the local memory. The storing of the transfer complete message can also be based on the interrupt signal.

In step 608, based on determining that the transfer complete message is stored at the local memory, the hardware data processor (e.g., CQE 522) can perform one or more actions. In one example, as shown in FIG. 5E, CQE handler 520 can transmit CQE 522 to host 302. The transmission can be based on, for example, writing CQE 522 into host memory 304 via a DMA operation over interconnect 310. As described above, host memory 304 can maintain a copy of completion queue 322, and CQE 522 can be stored in the copy of completion queue 322 of host memory 304. As another example, CQE handler 520 can transmit an interrupt signal to an interrupt register of host 302 (not shown in FIG. 5E), etc. Upon receiving CQE 522, host 302 can then transmit a start signal to hardware data processor 506 to start a computation operation based on the data. In a case where CQE 522 indicates missing or corrupted data, host 302 can also control hardware data processor 506 not to perform the computation operation on the data (e.g., based on not transmitting a start signal, or transmitting a stop signal). In another example, CQE handler 520 may start the computation operation at computation engine 312 based on the data, upon detecting that CQE 522 has been written into local memory 314 and that CQE 522 indicate no data error and no missing data, to further reduce the latency of the data synchronization operation and to further speed up the computation operations at computation engine 312. In such example, CQE handler 520 may or may not send CQE 522 to host 302. In a case where CQE 522 indicates missing or corrupted data, CQE handler 520 can also control hardware data processor 506 not to perform the computation operation on the data. CQE handler 520 may also transmit an error indication (which may include CQE 522) to host 302.

Figure 7:
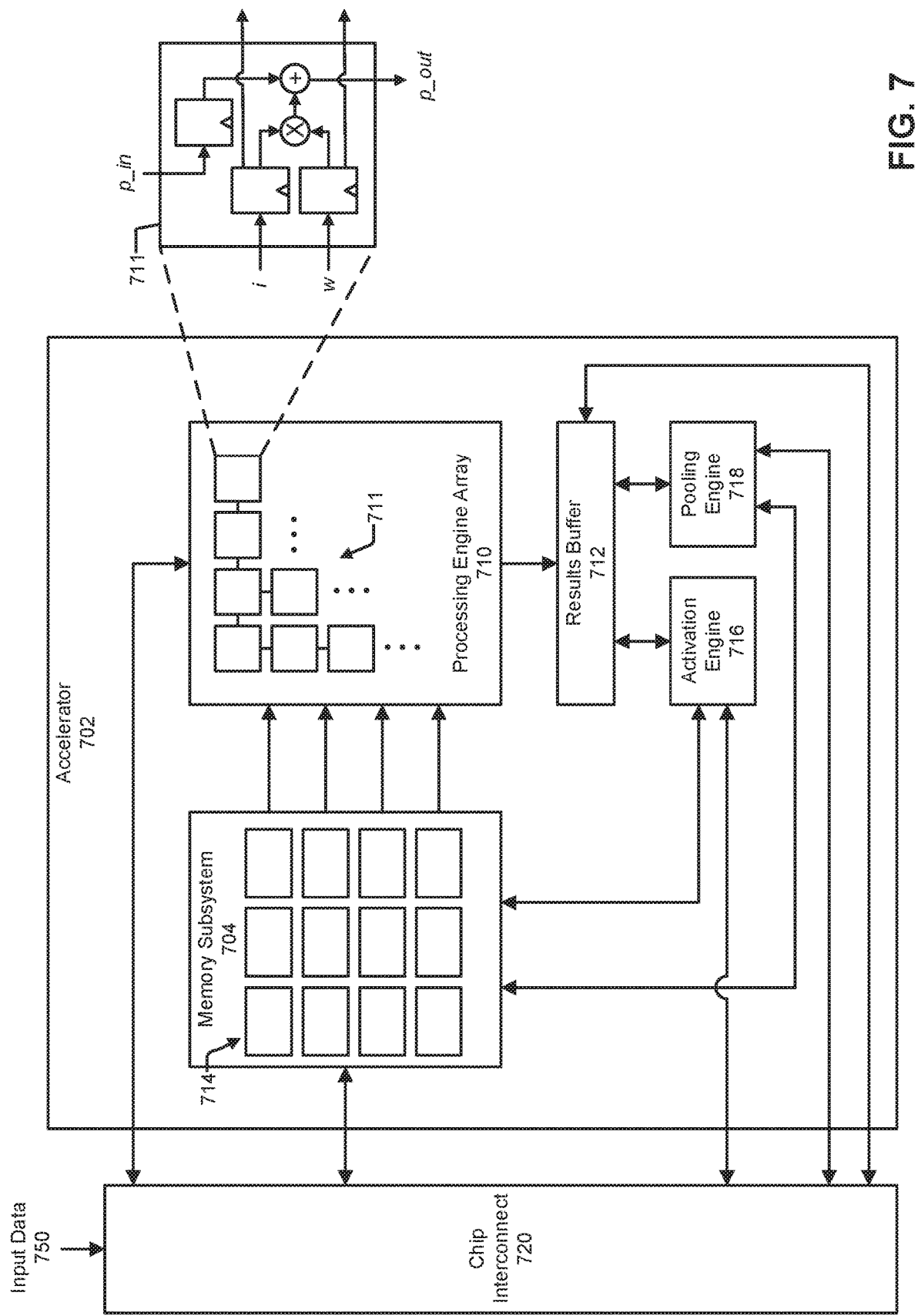
FIG. 7 illustrates an example of an acceleration engine that can be part of the computing server of FIG. 3A and FIG. 5A.

FIG. 7 is a block diagram illustrating an example of an integrated circuit device. The example of FIG. 7 illustrates an accelerator 702, which can be part of computation engine 312 of hardware data processor 306 of FIG. 3A and of hardware data processor 506 of FIG. 5A. In various examples, the accelerator 702, for a set of input data (e.g., input data 750), can execute computations using a processing engine array 710, an activation engine 716, and/or a pooling engine 718. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716 and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 428 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

Herein, the activation engine 716 and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
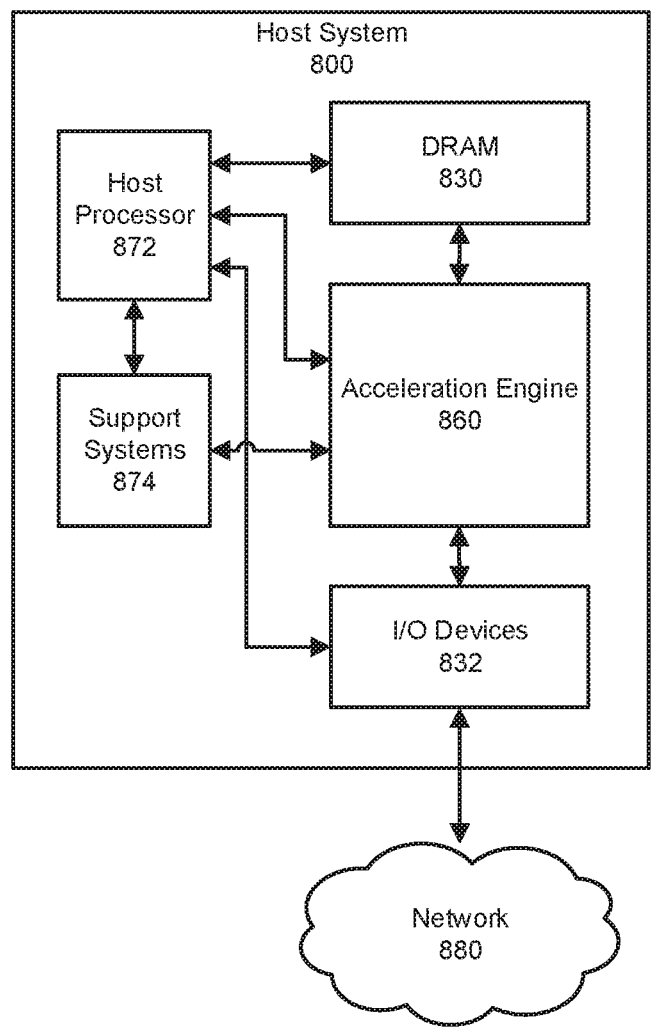
FIG. 8 illustrates an example of a host system that can be part of the computing server of FIG. 3A and FIG. 5A.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here. Host system 800 can include, for example, server computer 300 of FIG. 3A and server computer 500 of FIG. 5A.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package. Host processor 872 can correspond to, for example, host processor 303 of server computer 300 and server computer 500.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, or storage device buses.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIE) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIE. I/O devices 832 can correspond to interconnect 310.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer server, comprising:
    a host processor;
    a network adapter coupled with a network;
    a hardware data processor comprising a local memory and a computation engine; and
    an interconnect coupled between the host processor, the network adapter, and the hardware data processor;
    wherein the network adapter is configured to:
        receive network packets from the network, the network packets including data of a transaction;
        transmit the data to the interconnect to enable the interconnect to transmit the data to the hardware data processor;
        responsive to completing the transmission of the data to the interconnect, store a completion queue element (CQE) at a completion queue of the network adapter; and
        transmit the CQE to the hardware data processor; and
    wherein the hardware data processor is configured to:
        receive the CQE from the network adapter;
        in response to receiving the CQE from the network adapter, perform a flush operation to fetch any remaining portion of the data buffered in the interconnect, and to store the fetched portion of the data at the local memory;
        store the CQE at the local memory;
        responsive to storing the CQE at the local memory, transmit the CQE to the host processor to indicate to the host processor that the flush operation has completed and to enable the host processor to transmit a start signal back to the hardware data processor; and
        responsive to receiving the start signal, control the computation engine to perform a computation operation on the data stored at the local memory.

2. The computer server of claim 1, wherein the network adapter is configured to transmit the CQE to the hardware data processor based on at least one of: transmitting a request to write the CQE at the local memory of the hardware data processor, or transmitting an interrupt signal to an interrupt register of the hardware data processor.

3. The computer server of claim 1, wherein the hardware data processor is configured to transmit the CQE to the host processor based on at least one of: transmitting a request to write the CQE at a host memory accessible by the host processor, or transmitting an interrupt signal to an interrupt register of the host processor.

4. The computer server of claim 1,
    wherein the network adapter is configured to transmit, via the interconnect, write requests to write the data into the local memory; and
    wherein the hardware data processor is configured to:
        store the write requests at an access queue of the hardware data processor;

execute at least a part of the write requests based on fetching a first portion of the data from the interconnect and writing the first portion of the data into the local memory;
responsive to receiving the CQE from the network adapter, perform the flush operation based on executing the remaining write requests in the access queue to fetch the remaining portion of the data from the interconnect, and to write the remaining portion of the data into the local memory.

5. The computer server of claim 1, wherein the data include weight gradients generated by other worker nodes; and
wherein the computation operation comprises updating weights of a neural network model and performing a forward propagation operation using the neural network model having the updated weights.

6. An apparatus comprising:
a local memory;
a computation engine; and
a controller;
wherein the apparatus is coupled with a network adapter via an interconnect;
wherein the controller is configured to:
receive a transfer complete message from the network adapter, the transfer complete message indicating that the network adapter has initiated a transfer of data, received from a network, to the apparatus via the interconnect;
in response to receiving the transfer complete message from the network adapter, perform a flush operation to fetch any remaining portion of the data buffered in the interconnect to the local memory;
based on determining that the flush operation completes, store the transfer complete message at the local memory;
based on determining that the transfer complete message is stored at the local memory, perform one of:
transmitting the transfer complete message to a host processor to indicate to the host processor that the flush operation has completed and to enable the host processor to transmit a start signal back to the apparatus to start a computation operation of the data at the computation engine;
starting the computation operation of the data at the computation engine; or
performing an error handling operation based on the transfer complete message.

7. The apparatus of claim 6, wherein the network adapter includes a completion queue to store the transfer complete message;
wherein a first base address of the completion queue is mapped to a second base address of the local memory of the apparatus; and
wherein the apparatus is configured to receive the transfer complete message via a direct memory access (DMA) operation over the interconnect and based on the mapping between the first base address and the second base address.

8. The apparatus of claim 6, further comprising an interrupt register; and
wherein the apparatus is configured to receive the transfer complete message based on detecting an interrupt signal being stored at the interrupt register by the network adapter.

9. The apparatus of claim 6, wherein a first base address of the local memory is mapped to a second base address of a host memory of the host processor; and
wherein the controller is configured to transmit the transfer complete message to the host processor based on writing the transfer complete message at the host memory via a DMA operation over the interconnect and based on the mapping between the first base address and the second base address.

10. The apparatus of claim 6, wherein the host processor further includes an interrupt register;
wherein the controller is configured to transmit the transfer complete message to the host processor based on storing an interrupt signal at the interrupt register.

11. The apparatus of claim 6, further comprising an access queue to buffer write requests from the network adapter to write the data into the local memory;
wherein the controller is configured to:
execute at least a part of the write requests based on fetching a first portion of the data from the interconnect and writing the first portion of the data into the local memory; and
responsive to receiving the transfer complete message from the network adapter, perform the flush operation based on executing the remaining write requests in the access queue to fetch the remaining portion of the data from the interconnect and to write the remaining portion of the data into the local memory.

12. The apparatus of claim 11, wherein the controller is configured to:
receive, from the network adapter, a first write request to write the transfer complete message into the local memory;
store the first write request behind the remaining write requests in the access queue; and
execute the remaining write requests based on receiving or storing the first write request.

13. The apparatus of claim 6, wherein the interconnect includes an arbiter to select an order by which messages from the host processor and the network adapter are forwarded to the apparatus.

14. The apparatus of claim 13, wherein the interconnect includes a flow control mechanism to delay the forwarding of messages from the host processor and the network adapter to the apparatus.

15. The apparatus of claim 6, wherein the host processor is not involved in the transfer of the data from the network adapter to the apparatus.

16. The apparatus of claim 15, wherein the network adapter implements a protocol comprising at least one of: a Remote Direct Memory Access (RDMA) protocol, an InfiniBand protocol, an Internet Wide Area RDMA Protocol (iWARP) protocol, or a RDMA over Converged Ethernet (RoCE) protocol.

17. The apparatus of claim 6, wherein the interconnect comprises a Peripheral Component Interconnect Express (PCIE)) root-complex switch.

18. The apparatus of claim 6, wherein the data include weight gradients generated by other worker nodes; and
wherein the computation operation comprises updating weights of a neural network model and performing a forward propagation operation using the neural network model having the updated weights.

19. A method comprising:
receiving, by a hardware data processor and from a network adapter, a transfer complete message indicating that the network adapter has initiated a transfer of data received from a network to the hardware data processor, the transfer being performed over an interconnect coupled between the hardware data processor and the network adapter;

in response to receiving the transfer complete message from the network adapter, performing, by the hardware data processor, a flush operation to fetch any remaining portion of the data buffered in the interconnect to a local memory of the hardware data processor;

based on determining that flush operation is complete, storing, by the data hardware processor, the transfer complete message at the local memory; and based on determining that the transfer complete message is stored at the local memory, performing one of:

transmitting the transfer complete message to a host processor to indicate to the host processor that the flush operation has completed and to enable the host processor to transmit a start signal back to the hardware data processor to start a computation operation of the data;

starting the computation operation of the data at the hardware data processor; or performing an error handling operation based on the transfer complete message.

20. The method of claim 19, wherein the transfer complete message is received by the hardware data processor from the network adapter via one of: a direct memory access operation to write the transfer complete message at the local memory, or an interrupt signal to be stored at an interrupt register of the hardware data processor.

\* \* \* \* \*